US010215193B2

(12) United States Patent
Scovell et al.

(10) Patent No.: US 10,215,193 B2
(45) Date of Patent: Feb. 26, 2019

(54) VALVE ASSEMBLY

(71) Applicant: Meggitt Aerospace Ltd., Coventry (GB)

(72) Inventors: Matthew Scovell, Nantwich (GB); David Skolnik, Los Angeles, CA (US); Keith Jackson, Belper (GB); Scott Lathrope, Oak Park, CA (US)

(73) Assignee: Meggitt Aerospace Ltd., Coventry (GB)

( * ) Notice: Subject to any disclaimer, the term of this patent is extended or adjusted under 35 U.S.C. 154(b) by 0 days.

(21) Appl. No.: 15/421,114

(22) Filed: Jan. 31, 2017

(65) Prior Publication Data

US 2018/0216636 A1 Aug. 2, 2018

(51) Int. Cl.
| | |
|---|---|
| *F16K 47/08* | (2006.01) |
| *F04D 29/66* | (2006.01) |
| *F04D 27/02* | (2006.01) |
| *F16K 24/04* | (2006.01) |
| *F02K 3/06* | (2006.01) |

(52) U.S. Cl.
CPC ......... *F04D 29/663* (2013.01); *F04D 27/023* (2013.01); *F04D 27/0215* (2013.01); *F16K 24/04* (2013.01); *F16K 47/08* (2013.01); *F02K 3/06* (2013.01); *F05D 2220/323* (2013.01)

(58) Field of Classification Search
CPC ........... F16K 47/08; F16K 47/14; F16K 47/16
USPC ........................................ 137/540, 542, 543
See application file for complete search history.

(56) References Cited

U.S. PATENT DOCUMENTS

| | | | | |
|---|---|---|---|---|
| 1,020,921 A | * | 3/1912 | Miller ................... | F16K 15/063 137/536 |
| 1,151,508 A | * | 8/1915 | Blanchard ............. | F16K 15/063 137/494 |
| 1,676,666 A | * | 7/1928 | Pivoto ................... | E21B 21/002 137/533.29 |
| 1,990,130 A | * | 2/1935 | Leonz ................... | F16K 15/063 128/201.28 |

(Continued)

FOREIGN PATENT DOCUMENTS

| | | |
|---|---|---|
| EP | 2 798 247 B1 | 11/2016 |
| KR | 1020130043380 A | 4/2013 |

OTHER PUBLICATIONS

Extended European Search Reported dated Jun. 14, 2018, European Patent Application No. 18153108.8 (8 pages).

*Primary Examiner* — Marina A Tietjen
*Assistant Examiner* — Paul J Gray
(74) *Attorney, Agent, or Firm* — Knobbe, Martens, Olson & Bear LLP

(57) ABSTRACT

Features for a valve assembly are described. The features can include a pair of spaced walls having apertures defining non-linear exit flow paths for the fluid, such as air, exiting the valve. In some embodiments, the features are described for a bleed valve assembly, to reduce the decibels produced when used in high pressure contexts, such as aircraft engines. The noise suppression features are integrated with the valve assembly. A valve, such as a stem and valve head, can move within the assembly between open and closed positions. The valve assembly can be manufactured using additive layer manufacturing (ALM) to create a monolithic housing that in some embodiments has the noise suppression features built into the assembly.

9 Claims, 19 Drawing Sheets

(56) References Cited

U.S. PATENT DOCUMENTS

| | | | | | |
|---|---|---|---|---|---|
| 2,258,172 | A | * | 10/1941 | Blanchard | F16K 17/08 |
| | | | | | 137/542 |
| 2,405,241 | A | * | 8/1946 | Smith | E03C 1/295 |
| | | | | | 137/526 |
| 4,177,780 | A | * | 12/1979 | Pellerin | F02M 29/04 |
| | | | | | 123/590 |
| 4,244,441 | A | * | 1/1981 | Tolman | F01D 25/30 |
| | | | | | 181/213 |
| 4,368,756 | A | * | 1/1983 | Carlson | F16K 15/06 |
| | | | | | 137/541 |
| 4,617,963 | A | | 10/1986 | Stares | |
| 5,266,754 | A | * | 11/1993 | Swift | G10K 11/16 |
| | | | | | 181/230 |
| 5,772,178 | A | | 6/1998 | Bey | |
| 6,880,579 | B2 | | 4/2005 | Boger | |
| 7,387,489 | B2 | | 6/2008 | Appleby et al. | |
| 7,730,995 | B2 | | 6/2010 | Hunt et al. | |
| 8,024,935 | B2 | | 9/2011 | Hoover et al. | |
| 8,272,222 | B2 | | 9/2012 | Zhang et al. | |
| 8,336,316 | B2 | | 12/2012 | Kirby | |
| 8,511,096 | B1 | | 8/2013 | Haugen et al. | |
| 8,550,208 | B1 | * | 10/2013 | Potokar | F02K 3/075 |
| | | | | | 181/212 |
| 8,590,308 | B2 | | 11/2013 | Kirby | |
| 9,175,577 | B2 | | 11/2015 | Papamoschou et al. | |
| 2002/0038672 | A1 | * | 4/2002 | Tsourides | F16K 27/003 |
| | | | | | 137/884 |
| 2005/0067218 | A1 | * | 3/2005 | Bristow | F01D 17/105 |
| | | | | | 181/237 |
| 2007/0240774 | A1 | * | 10/2007 | McCarty | F16K 47/08 |
| | | | | | 137/625.37 |
| 2017/0001484 | A1 | | 1/2017 | Keller et al. | |

* cited by examiner

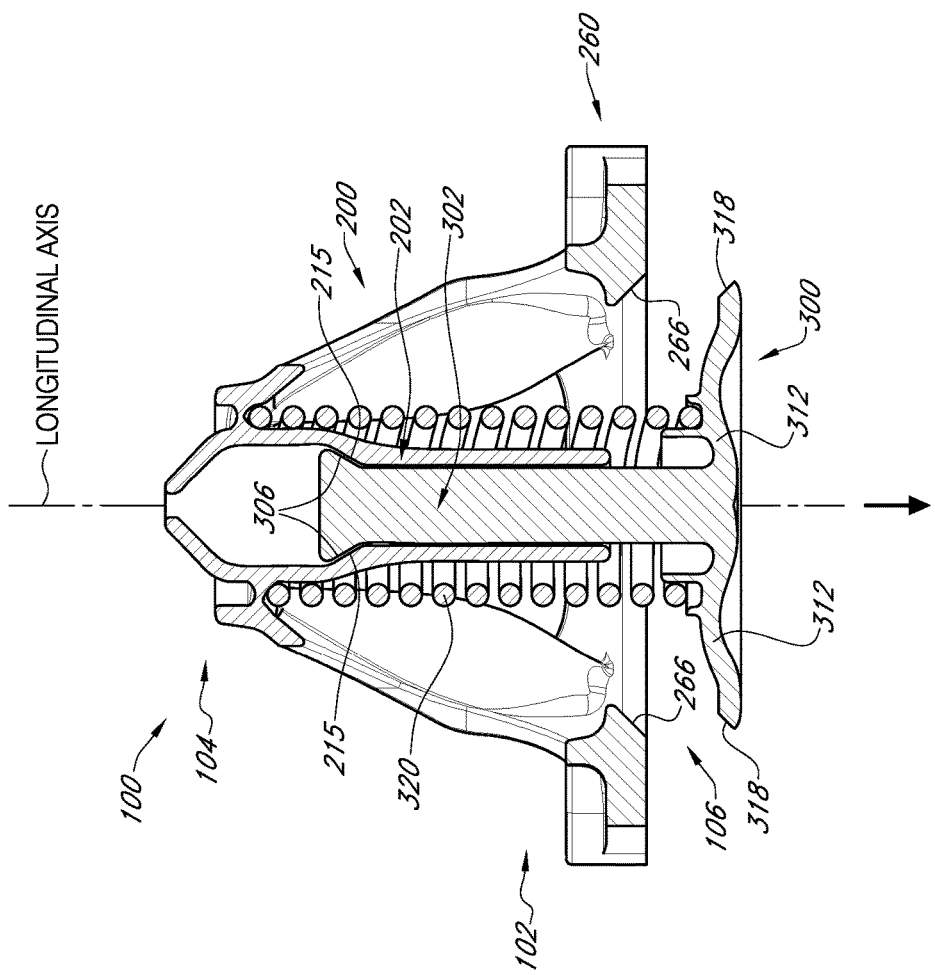

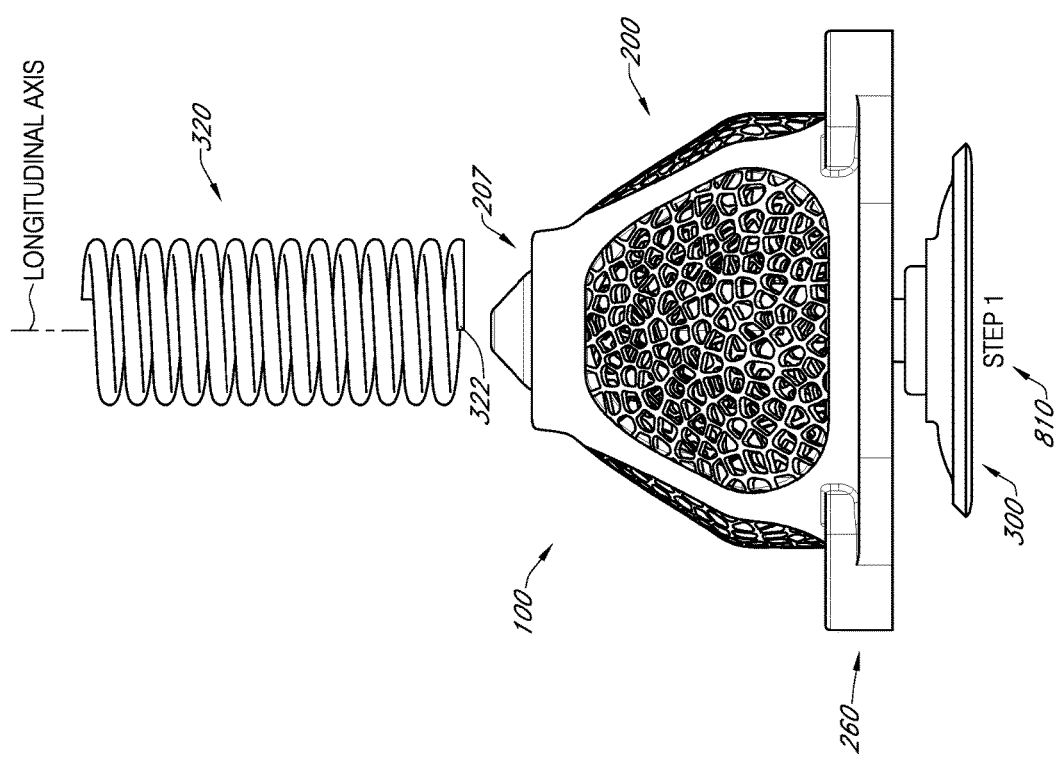

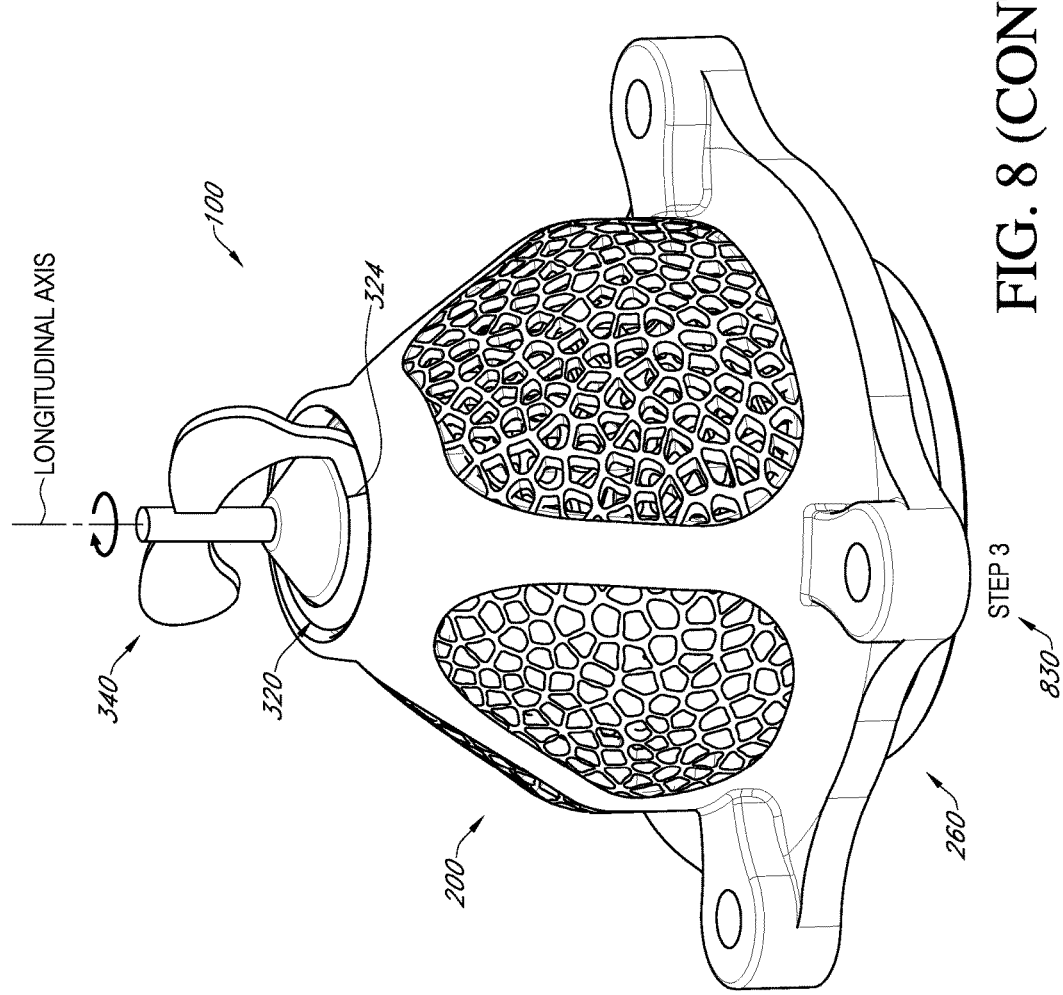

VALVE ASSEMBLY

BACKGROUND

Field

This technology relates generally to valves, in particular to valve assemblies, for example bleed valve assemblies having integrated noise suppression features.

Description of Related Art

Valves are used in many contexts, such as industrial and aerospace applications. Valves operate under high pressures, high speed flows and other demanding requirements.

In some implementations, valves may generate high decibel noise. Bleed valve assemblies for aircraft engines are one example. Typically, suppression of the noise from bleed valve assemblies on aircraft is addressed with heavy attenuators and pepper-pots in downstream ducting. Mufflers and silencers are usually added onto existing valves. The added weight, volume and complexity of such solutions are disadvantageous, for example with aircraft where weight and manufacturing cost are important. Additionally, valve designs have been limited by the existing manufacturing methods available (e.g., casting, machining), which have limited the geometry of valve designs.

SUMMARY

Therefore, there is a need for improved valve assemblies that utilize new manufacturing methods to provide new valve geometries that provide an improvement in valve operation. In some aspects, solutions to suppressing noise from valve assemblies are provided that overcome one or more of the aforementioned drawbacks above. The embodiments disclosed herein present improved solutions. Each embodiment has several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods.

The following disclosure describes non-limiting examples of some embodiments. For instance, other embodiments of the disclosed systems, devices and methods may or may not include the features described herein. Moreover, disclosed advantages and benefits can apply only to certain embodiments of the invention and should not be used to limit the disclosure.

Features for noise suppression of valves are described. The features can include a pair of spaced walls having apertures defining non-linear exit flow paths for the fluid, such as air, exiting the valve. In some embodiments, the features are described for a bleed valve assembly or in line valve assembly, to reduce the decibels produced when used in high pressure contexts, such as aircraft engines. The noise suppression features are integrated with the valve assembly (e.g., integrated within a housing of the valve assembly). A valve, such as a stem and valve head, can move within the housing between open and closed positions. The valve assembly can be manufactured using additive layer manufacturing (ALM) to create a monolithic housing having the noise suppression features built into the assembly.

In one aspect, a valve assembly is described. The valve assembly comprises a housing comprising a base, and two or more walls (e.g., a first wall and a second wall). The base extends circumferentially about a longitudinal axis. The first wall is coupled with the base and extends to a distal end of the housing. The first wall extends circumferentially about the longitudinal axis. The first wall comprises a plurality of first apertures extending therethrough. The second wall is coupled with the base and extends to the distal end of the housing. The second wall extends circumferentially about the longitudinal axis and at least partially surrounds the first wall. The second wall comprises a plurality of second apertures extending therethrough. The housing forms a continuous structure. In some embodiments, the valve assembly may be a bleed valve assembly.

In some embodiments, at least some of the plurality of first apertures of the first wall are offset from second apertures of the second wall so as to define a plurality of non-linear flow paths that extend from at least some of the plurality of first apertures to the second apertures. At least some of the first and second apertures may be non-circular. The plurality of first and second apertures may define first and second lattices of the first and second walls, respectively. The second wall may be radially spaced apart from the first wall such that a channel is defined therebetween, and an annular width of the channel may vary between the first and second walls at different locations along lengths of the first and second walls. The elongated guide, the base, the first wall and the second wall may be formed by additive layer manufacturing (ALM).

In some embodiments, the valve assembly further comprises an inwardly tapered section of the internal chamber of the guide, and a valve. The valve comprises an elongated stem and a valve head. The elongated stem extends from a distal end to a proximal end. The stem extends through the proximal opening of the guide and at least partially through an internal chamber of the guide. The distal end of the stem has an outwardly tapered section that limits proximal movement of the valve by mechanically communicating with the inwardly tapered section of the internal chamber of the guide. The valve head is coupled with and extends radially outward from the proximal end of the stem and that limits distal movement of the valve by mechanically communicating with the base. The valve is moveable proximally and distally along the longitudinal axis between an open position and a closed position, wherein in the open position the valve head is spaced apart from the base and in the closed position the valve head contacts the base.

In some embodiments, the elongated guide, the base, the first wall, the second wall, and the valve are formed by additive layer manufacturing (ALM). The valve assembly may further comprise a spring surrounding the guide and extending from the distal portion of the guide to a proximal portion of the valve, where the spring biases the valve to the open position.

In another aspect, in combination with an aircraft engine, a valve assembly is described. The valve assembly comprises a valve housing comprising a base, a first wall and a second wall. The base extends circumferentially about the longitudinal axis and is coupled with a surface of the aircraft engine. The first wall is coupled with the base and extends to a distal end of the housing. The first wall extends circumferentially about the longitudinal axis. The first wall comprises a plurality of first apertures extending therethrough. The second wall is coupled with the base and extends to the distal end of the housing. The second wall extends circumferentially about the longitudinal axis and at least partially surrounds the first wall. The second wall comprises a plurality of second apertures extending therethrough. The elongated guide, the base, the first wall and the second wall form a continuous structure.

In some embodiments of the combination aircraft and valve assembly, at least some of the plurality of first apertures of the first wall are offset from second apertures of the second wall such that a plurality of non-linear flow paths extend from at least some of plurality of first apertures to the second apertures.

In some embodiments of the combination aircraft and valve assembly, the valve assembly further comprises an inwardly tapered section of the internal chamber of the guide, and a valve. The valve comprises an elongated stem and a valve head. The elongated stem extends from a distal end to a proximal end. The stem extends through the proximal opening of the guide and at least partially through an internal chamber of the guide. The distal end of the stem has an outwardly tapered section that limits proximal movement of the valve by mechanically communicating with the inwardly tapered section of the internal chamber of the guide. The valve head is coupled with and extends radially outward from the proximal end of the stem and that limits distal movement of the valve by mechanically communicating with the base. The valve is moveable proximally and distally along the longitudinal axis between an open position and a closed position, wherein in the open position the valve head is spaced apart from the base and in the closed position the valve head contacts the base. In some embodiments, the elongated guide, the base, the first wall, the second wall, and the valve are formed by additive layer manufacturing (ALM).

In another aspect, a method of manufacturing a valve assembly is described. The method comprises forming the valve assembly layer by layer from a first end of the bleed valve assembly to an opposite second end of the valve assembly. The valve assembly comprises a housing comprising a base, a first wall and a second wall. The base extends circumferentially about the longitudinal axis. The first wall is coupled with the base and extends to a distal end of the housing. The first wall extends circumferentially about the longitudinal axis. The first wall comprises a plurality of first apertures extending therethrough. The second wall is coupled with the base and extends to the distal end of the housing. The second wall extends circumferentially about the longitudinal axis and at least partially surrounds the first wall. The second wall comprises a plurality of second apertures extending therethrough. The housing forms a continuous structure.

In another aspect, a valve assembly is described. The valve assembly comprises a monolithic housing. The monolithic housing comprises a base and two or more walls. The base extends circumferentially about a longitudinal axis and forms an inlet at a proximal end of the housing. The two or more walls are radially spaced apart from each other and extend circumferentially about the axis from the base toward a distal end of the monolithic housing. Each of the walls has one or more lattices defined by a plurality of apertures that allow air flow generally transverse to the longitudinal axis. The one or more lattices define a plurality of nonlinear flow paths between the plurality of apertures through the walls.

In some embodiments, the valve assembly further comprises an elongated valve stem that extends along the longitudinal axis and a valve head at a proximal end of the valve stem. The valve is movably supported relative to the monolithic housing and is configured to move axially along the longitudinal axis between an open position and a closed position. In the open position the valve head is spaced apart from the valve seat, and in the closed position the valve head is adjacent the valve seat. In some embodiments, the valve assembly may be a bleed valve assembly.

In some embodiments, the monolithic housing and the valve are formed as an assembly by additive layer manufacturing (ALM). At least some of the plurality of apertures may be non-circular. The pair of walls may extend from the base toward the distal end of the monolithic housing and toward the axis. The monolithic housing may be dome-shaped. The pair of walls radially spaced apart from each other define one or more channels between the one or more lattices, where the one or more channels each have an annular width that varies between the pair of walls at different locations along lengths of the pair of walls. The valve assembly may further comprise one or more structural ribs that separate adjacent lattices in each wall of the pair of walls.

In some embodiments, the pair of walls includes an inner wall and an outer wall. The inner wall comprises a proximal section, an intermediate section and a distal section. The proximal section extends distally from the base. The intermediate section extends distally and toward the axis from the proximal section at a first angle relative to the axis. The distal section extends distally and toward the axis from the intermediate section at a second angle relative to the axis. The first angle is greater than the second angle.

In some embodiments, the outer wall comprises a proximal section and a distal section. The proximal section extends distally from the base. The distal section extends distally and toward the axis from the proximal section at a third angle relative to the axis. The third angle is approximately equal to the second angle In another aspect, a bleed valve assembly is described. The bleed valve assembly comprises a valve body having an inlet region, the inlet region configured to receive a fluid; and an outlet comprising an outlet region configured to receive the fluid after the inlet region, a first wall at least partially surrounding the outlet region, the first wall comprising a plurality of first apertures extending through the first wall, wherein the plurality of first apertures are configured to receive the fluid after the outlet region, and a second wall at least partially surrounding the first wall, the second wall comprising a plurality of second apertures extending through the second wall, wherein the plurality of second apertures are configured to receive the fluid after the plurality of first apertures, wherein the valve body and the outlet form a continuous structure.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described

FIGS. 2A-2B are side cross-section views of the valve assembly of FIG. 1A shown, respectively, in a closed and open position.

DETAILED DESCRIPTION

Figure 1A:
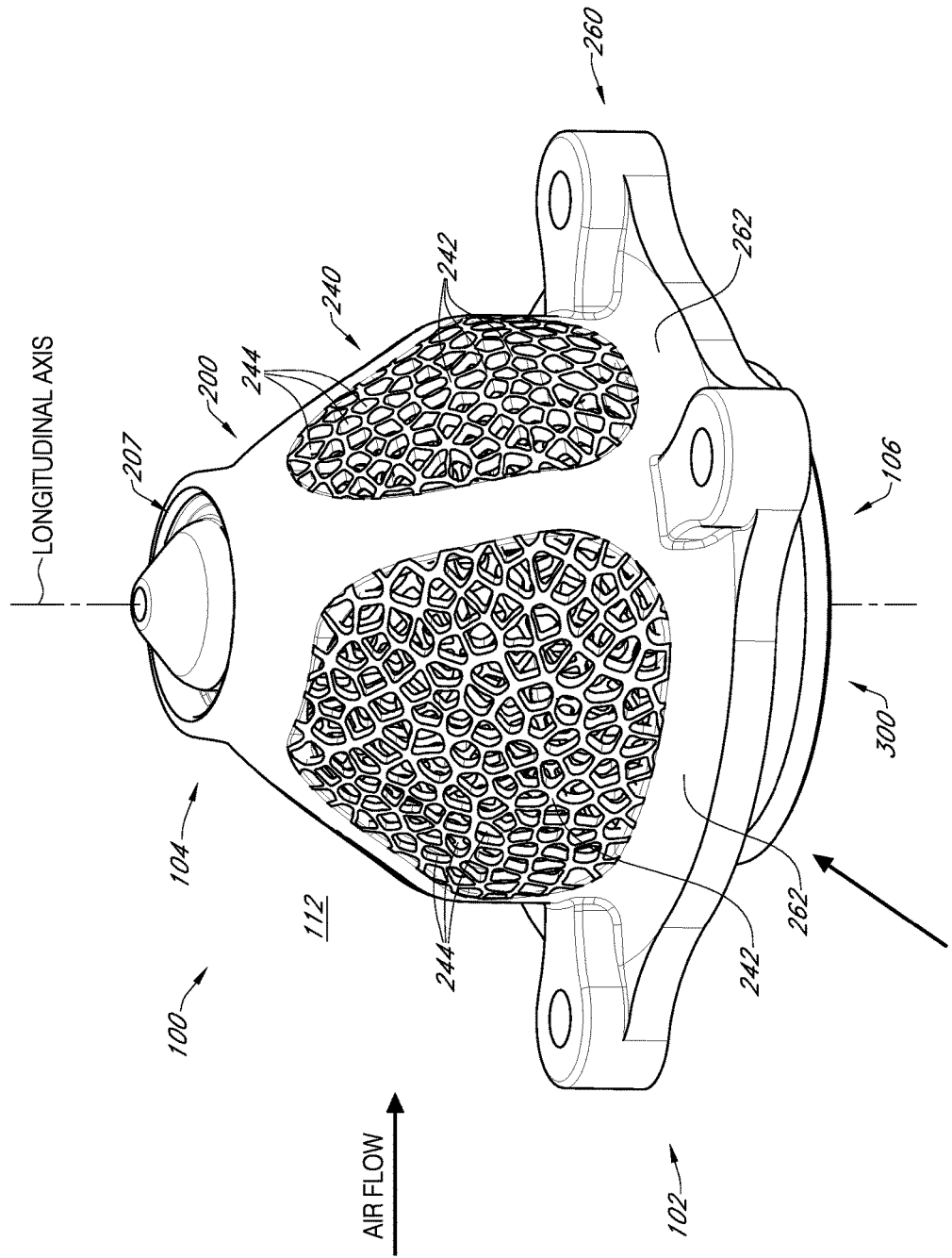
FIG. 1A is a perspective view of an embodiment of a valve assembly.

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments.

Systems, devices and methods for valves, including valves having noise suppression features are described herein. In some embodiments, the features are described with respect to an assembly for a bleed valve. Other types of valves may incorporate some of the features described herein, such as other bleed valves, inline valves, ball valves, sleeve valves, electrically actuated valves, hydraulically actuated valves, pneumatically actuated valves, mechanically actuated valves, etc. A bleed valve removes fluid from a system into either ambient conditions or a bleed duct. For instance, aerospace bleed valve may be used for start bleed from an aircraft engine, anti-ice bleed from the engine, bleed from environmental control systems, etc. High volume noise is a constant across bleed valves with large pressure differentials. High pressure fluid expands to generate noise and the fluid accelerates around surrounding structures in the bleed valve causing vortices which generate additional noise. Other types of valves besides bleed valves can generate high decibel noise as well, and thus the description of a particular bleed valve is not limiting the noise suppression features to only that type of valve.

The bleed valve assembly described herein advantageously includes noise suppression features integrated into the valve assembly itself (e.g., integrated into a housing of the valve assembly). Thus, no external or separate attachments, such as mufflers, silencers, etc., are needed to be attached to the valve. In some embodiments, the bleed valve assembly has a housing with a pair of walls, such as inner and an outer wall, separated by an annular channel and with apertures extending through both walls. The walls may provide a volume internal to the valve for air expansion. Further, the exit flow path for air, and/or other fluids, flowing out of the valve may be indirect, e.g. non-linear, from at least some of the apertures in the inner wall to the apertures in the outer wall. These and other features reduce noise within the bleed valve assembly, without the need for a muffler or silencer, and maintain bleed valve assembly flow and strength while reducing bleed valve assembly weight. The apertures may form a lattice or lattice-like feature in the walls. The sizes of the apertures, locations of the apertures, concentration or density of the apertures, surface area covered by the apertures, and other aspects of the apertures and walls may be chosen to reduce the noise produced by the bleed valve assembly for a particular use of the valve.

The noise suppression features may be integrated with the valve by manufacturing the valve using additive layer manufacturing (ALM). ALM is the process of building a 3D part by adding successive layers or extrusions together to form a final piece, allowing for manufacture of complex structures (e.g., unitary, seamless, continuous, or otherwise monolithic structures). Example ALM processes include selective laser melting (SLM) and electron beam melting (EBM). Use of ALM techniques allow for fabrication of the bleed valve assembly having integrated noise suppression features, resulting in a lower weight, simpler and less expensive solution to suppressing noise from bleed valves.

FIG. 1A is a perspective view of an embodiment of a valve assembly 100, which may be a bleed valve assembly, or other type of valve. The valve assembly 100 extends from a proximal portion 102 to a distal portion 104. The distal portion 104 is opposite the proximal portion 102. The valve assembly 100 may be used, for example, with the proximal portion 102 attached to or with an aircraft engine, or other target system. Fluid, such as air, from within the target system may enter the valve assembly 100 at or near the proximal portion 102 and exit the valve assembly 100 at or near the distal portion 104 and/or other portions of the valve assembly 100. The valve assembly 100 may include an inlet 106. Air may enter the valve assembly 100 through the inlet 106. The inlet 106 may be located at or near the proximal portion 102. Air may exit the valve assembly 100 to an exterior 112. The exterior 112 may be an ambient atmosphere, an exit duct, passing air stream or other volume. For example, the exterior may be a fan by pass flow for a turbo fan aircraft engine, ambient atmosphere, etc.

The valve assembly 100 may be described with respect to various geometric references. As shown, the valve assembly 100 may define a longitudinal axis. The axis may extend through a geometric center of the valve assembly 100. The axis may extend from the proximal portion 102 to the distal portion 104. The axis may extend beyond the proximal and distal portions 102, 104. In some embodiments, the valve assembly 100 may be symmetric with respect to the axis. In some embodiments, the valve assembly 100 may not be symmetric with respect to the axis.

Various features of the valve assembly 100 may be described with respect to the axis. For example, features that extend "circumferentially about" the axis, "annularly," and the like indicates the feature generally bounds the axis. Such feature may extend circularly, non-circularly, or combinations thereof about the axis. Such feature thus may or may not include the axis as a center of rotation.

In addition, directions described as "outward," "outer," and the like refer to directions generally away from the axis, including but not limited to radially outward. Directions described as "inward," "inner," and the like refer to directions generally toward the axis, including but not limited to radially inward. Features described as "farther outward" and the like refer to features that are farther from the axis as measured from the feature perpendicularly to the axis. Features described as "farther inward" and the like refer to features that are closer to the axis as measured from the feature perpendicularly to the axis. Thus, the use of the axis to describe various features of the valve assembly 100 is for clarity only and is not meant to be limiting the scope of the relevant feature.

The valve assembly 100 may include a housing 200. The housing 200 may form part of the proximal portion 102 and/or distal portion 104 of the valve assembly 100. The housing 200 can have a generally dome-like shape. In some embodiments, the housing 200 may have other shapes. The housing 200 may be rounded, non-rounded, or combinations thereof. The housing 200 may extend circumferentially about the axis. The housing 200 may form at least part of the inlet 106 at the proximal portion 102. The housing 200 may be formed from a variety of materials, including stainless steel, other metals, polymers, composites or alloys, stainless steel 15-5PH powder, other powders, other suitable materials, or combinations thereof.

The housing 200 may be a monolithic housing 200. "Monolithic" is used herein in its ordinary and usual meaning, and includes but is not limited to a single piece of material that is continuous and without seams. For example, the housing 200 may be formed using ALM to create a monolithic housing 200. Such a monolithic housing 200 would thus be a continuous structure without seams and forming a single piece of material. Those of skill in the art of ALM will understand that a single part made with ALM, for example layer by layer as further described herein, will be an example of a "monolithic" part, as used herein. In other embodiments, the housing 200 may be made of multiple parts that can be assembled together.

The valve assembly 100 may include a spring channel 207. The spring channel 207 may be part of the housing 200. The spring channel 207 may be an opening extending into the distal portion 104 of the valve assembly 100, such as into the housing 200. The spring channel 207 may be configured to receive all or part of a spring 320 (see FIG. 8) therein for assembling the spring 320 with the valve assembly 100. Further detail of the spring channel 207 and assembly of the spring 320 with the valve assembly 100 is described herein, for example with respect to FIG. 8.

The valve assembly 100 may include two or more walls, such as a first wall 230 (see FIGS. 1D-1E) and a second wall 240. The first and second walls 230, 240 may be part of the housing 200. The first wall 230 may be an inner wall and the second wall 240 may an outer wall of the valve assembly 100. The first wall 230 may thus be located generally closer to the axis relative to the second wall 240. The second wall 240 may thus be located generally farther from the axis relative to the first wall 230. The first and second walls 230, 240 may include features that define indirect flow paths for air exiting the valve assembly 100, as further described. The first wall 230 is further described herein, for example with respect to FIGS. 1D-1E.

The second wall 240 includes a wall body 242. The body 242 is a structural portion of the second wall 240. The body 242 may be formed from a variety of materials, including stainless steel, other metals, polymers, composites or alloys, stainless steel 15-5PH powder, other powders, other suitable materials, or combinations thereof. The body 242 may extend circumferentially about the axis. The body 242 may be solid, porous, or combinations thereof. As shown, the body 242 may include some porous sections and some solid sections. In some embodiments, the body 242 may include four porous sections and four solid sections. The body 242 may include one, two, three, five or more porous sections. The body 242 may include one, two, three, five or more solid sections. The porous sections of the body 242 may form a lattice-like structure. For instance, the body 242 may form a plurality of lattice beams, such as thin segments of the body 242 surrounding openings in the second wall 240. Further detail of the size, shape, etc. of the body 242 surrounding openings in the second wall is described herein, for example with respect to FIG. 1F.

The second wall 240 includes a plurality of apertures 244. For clarity, only some of the apertures 244 are labelled in the figures. The apertures 244 may be in the porous sections of the wall 240. The apertures 244 may be openings extending through the second wall 240. The apertures 244 may be formed by portions of the body 242. The body 242 may surround and define the apertures 244 of the second wall 240. There may be ten, twenty, thirty, forty, fifty, one hundred, two hundred, three hundred, four hundred, five hundred, or any lesser, intermediate or greater number of apertures 244. The apertures 244 may be implemented in various concentrations. For example, the apertures 244 may provide a percentage or ratio of open to closed surface area of the second wall 240. The apertures 244 may provide for 10%, 20%, 30% 40%, 50%, 60%, 70%, 80%, 90% or any lesser, intermediate or greater percentage of open to closed surface area of the second wall 240. In some embodiments, the second wall 240 can have a thickness T1 that is substantially constant. For example, in some embodiments, the thickness T1 can be approximately 1-4 mm, such as about 2 mm. In other embodiments, the thickness T1 of the second wall 240 can vary (e.g., not be a constant value).

The apertures 244 may extend generally transverse to the axis. "Generally transverse" includes but is not limited to directions that are at an angle with respect to the axis. For example, the apertures 244 may extend perpendicularly to the axis, e.g. radially, may include local axes that may or may not intersect the longitudinal axis of the valve assembly 100, may be at a ten, twenty, thirty, forty, fifty or sixty degree angle with respect to the axis, or at other orientations. In some embodiments, there may be some apertures 244 that extend parallel to the longitudinal axis, for example at or near the distal portion 104 of the valve assembly 100, or in other locations. The apertures 244 may be various shapes, sizes, etc. That is, the geometry of the apertures 244 can vary in six degrees of freedom. Further detail of the apertures 244 is described herein, for example with respect to FIG. 1F.

The valve assembly 100 may include a base 260. The base 260 may be part of the housing 200. The base 260 may extend circumferentially about the axis. The base 260 may include a flange 262, which may be a flange-like protrusion. The base 260, for example the flange 262, may extend outward, e.g. radially, from or near the proximal portion 102 of the valve assembly 100. The base 260 may provide features for securing the valve assembly 100 to a target device, such as an aircraft engine. The base 260 may couple with various features of the valve assembly 100, such as the first and second walls 230, 240.

The valve assembly 100 may include a valve 300. The valve 300 may be a valve component of the bleed valve assembly 100 assembly. The valve 300 may move to an open position where air can enter the valve assembly 100. The valve 300 may move to a closed position where less or no air can enter the valve assembly 100. The valve 300 may seal against various features, such as the housing 200, to completely close off the inlet 106 to the valve assembly 100. Further detail of the valve is described herein, for example with respect to FIG. 1E.

Figure 1B:
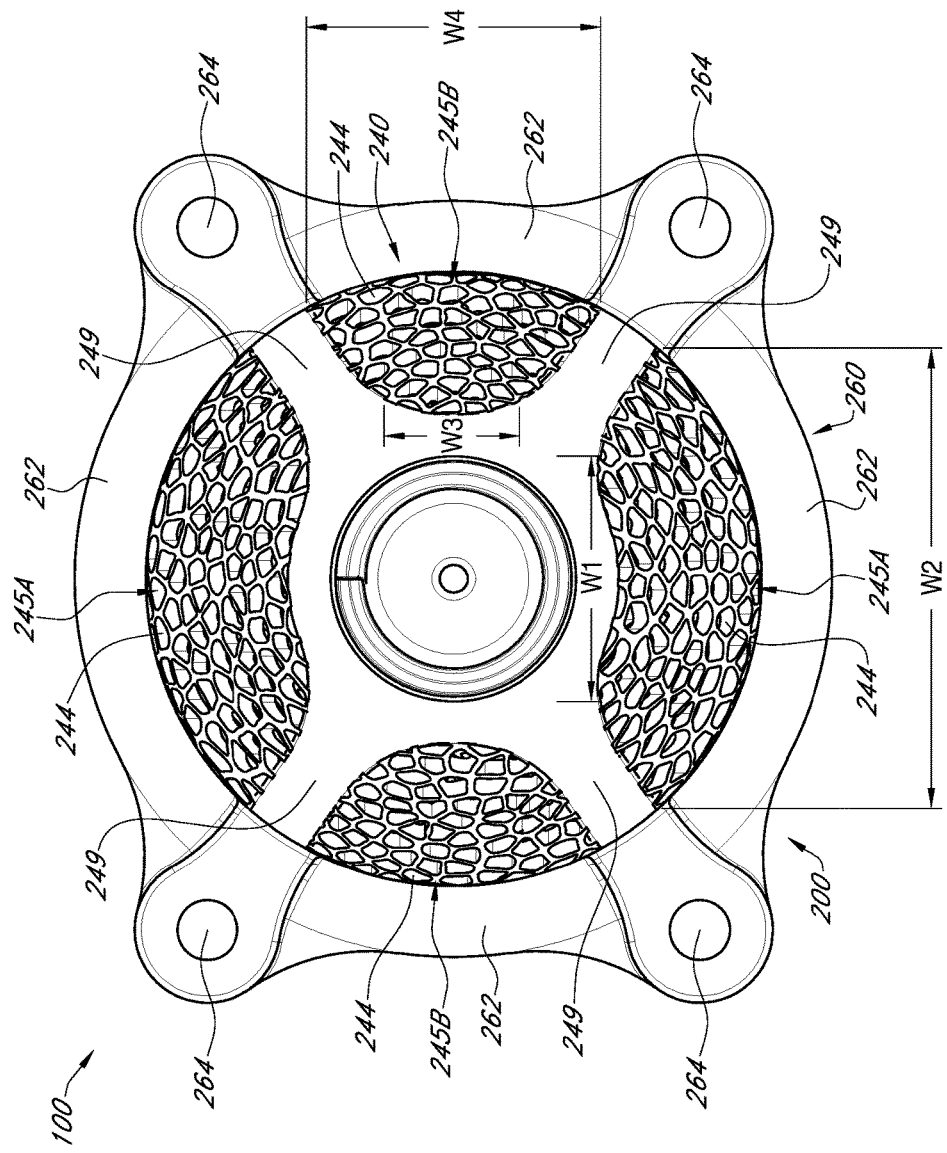
FIG. 1B is a top view of the valve assembly of FIG. 1A.

FIG. 1B is a top view of the bleed valve assembly 100. The planform of the valve assembly 100 as viewed from the top may have a generally rectangular shape with rounded edges, as shown. For instance, the valve assembly 100 may be longer along a first direction relative to a second perpendicular direction, as viewed in FIG. 1B. In some embodiments, the valve assembly 100 may have a planform that is square, circular, other shapes, or combinations thereof.

As shown, there may be two windows 245A of apertures 244 and two windows 245B of apertures 244. The each of the two windows 245A can optionally differ in shape and size from each other, as well as differ in shape and size (e.g., geometry of apertures 244) with the two windows 245B. Similarly, each of the two windows 245B can optionally differ in shape and size (e.g., geometry of apertures) from each other, as well as differ in shape and size from the two windows 245A. In other embodiments, the two windows 245A can have substantially the same shape and size, and the two windows 245B can have substantially the same shape and size. In still other embodiments, all of the windows 245A, 245B can have substantially the same shape and size. Each "window" may be a grouping together of the apertures 244 to form a lattice section of the second wall 240. The two windows 245A may be located opposite each other, and the two windows 245B may be located opposite each other. The window 245A may have an upper width W1 and a lower width W2, as indicated. In some embodiments, W1 may be from about 0.5 inches to about 2 inches. In some embodiments, W1 may be about 1.04 inches. In some embodiments, W2 may be from about 1 inch to about 3 inches. In some embodiments, W2 may be about 1.81 inches. The window 245B may have an upper width W3 and a lower width W4, as indicated. In some embodiments, W3 may be from about 0.25 inches to about 1.5 inches. In some embodiments, W3 may be about 0.55 inches. In some embodiments, W4 may be from about 0.5 inches to about 2.5 inches. In some embodiments, W4 may be about 1.15 inches. These are merely examples and any smaller or larger dimensions may be implemented. In some embodiments, all windows 245A, 245B may be the same dimensions.

The windows 245A, 245B or lattice sections of the second wall 240 may each be separated by one of four ribs 249. The ribs 249 may be part of the housing 200. The ribs 249 may form part of the solid portion of the second wall 240. The ribs 249 may be structural supports for the second wall 240 sections. The ribs 249 may extend into the valve assembly 100 to provide increased stiffness to the first and/or second wall 230, 240. The ribs 249 may couple with the base 260, for example with the flange 262. In other embodiments, the housing 200 can have a plurality of ribs 249 (e.g., more than 4, more than 10, etc.) that at least partially define a plurality of windows or lattice sections in the housing 200. In other embodiments, the ribs can be excluded, and the housing 200 can have a continuous lattice about its circumference.

The valve assembly 100 may include one or more attachment holes 264. The holes 264 may be included in the housing, for example in the base 260. As shown, there may be four holes 264 located at corners of the housing 200. The holes 264 may be threaded, blind, etc. Fasteners, such as screws, bolts, etc. may be inserted through the holes to secure the valve assembly 100 to a target device.

Figure 1C:
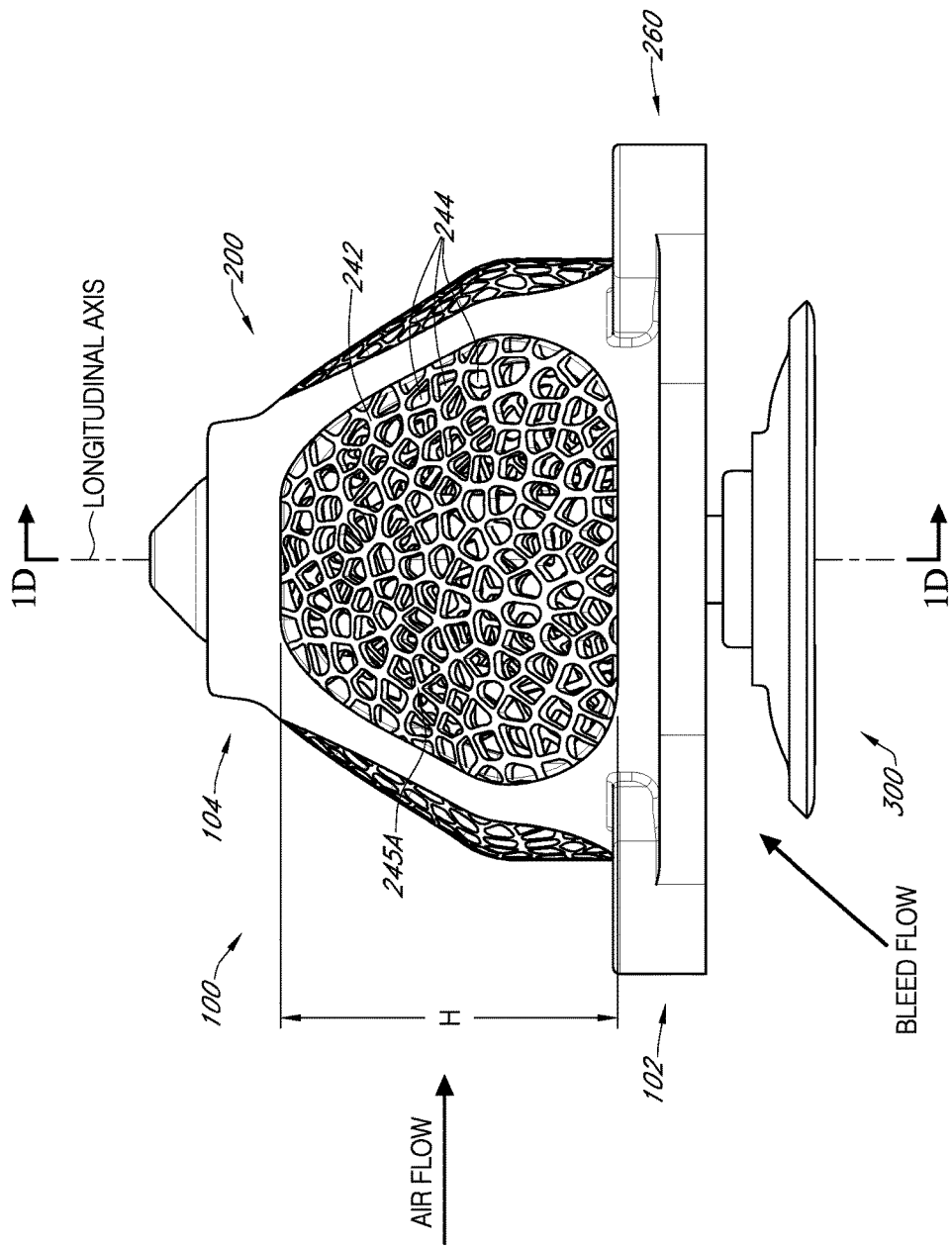
FIG. 1C is a side view of the valve assembly of FIG. 1A.
Figure 1D:
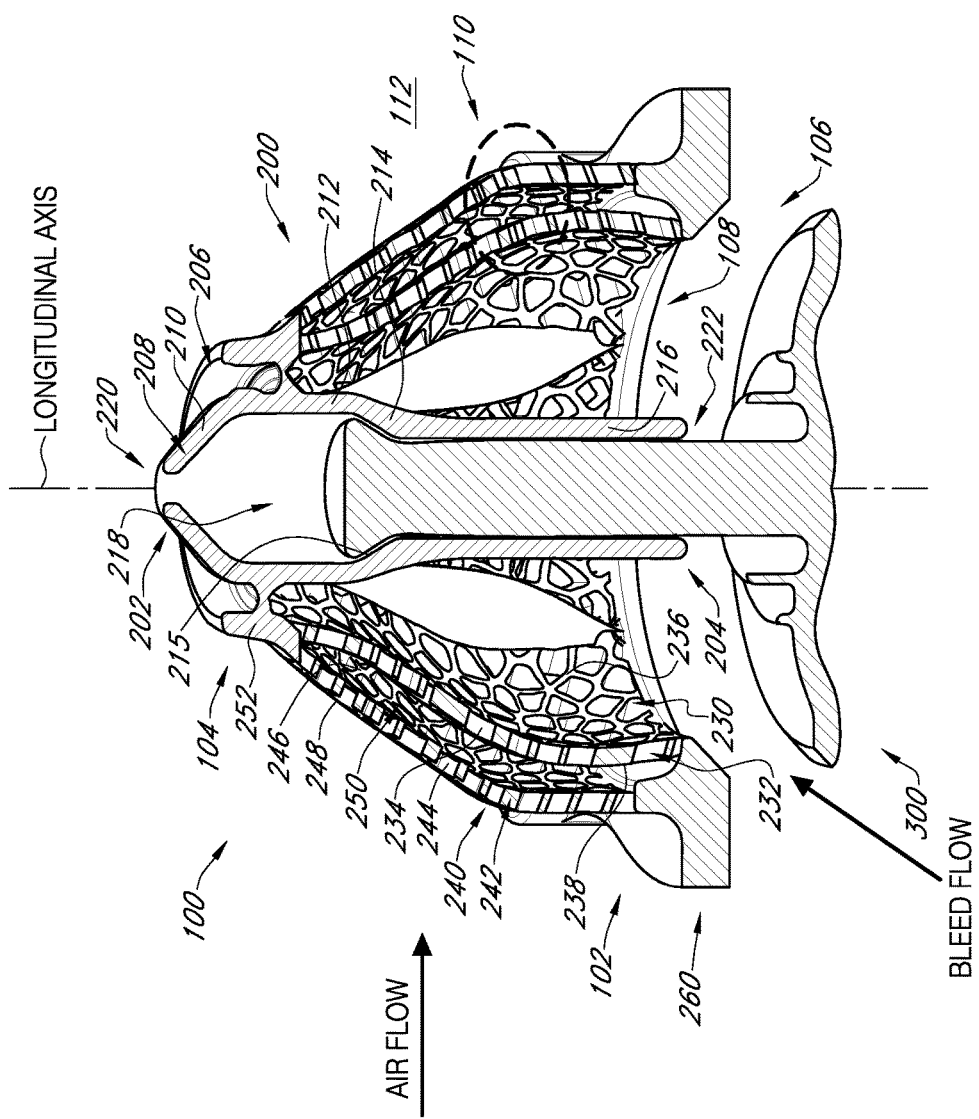
FIGS. 1D and 1E are cross-section views of the valve assembly of FIG. 1A as taken along the line 1D-1D indicated in FIG. 1C.
Figure 1E:
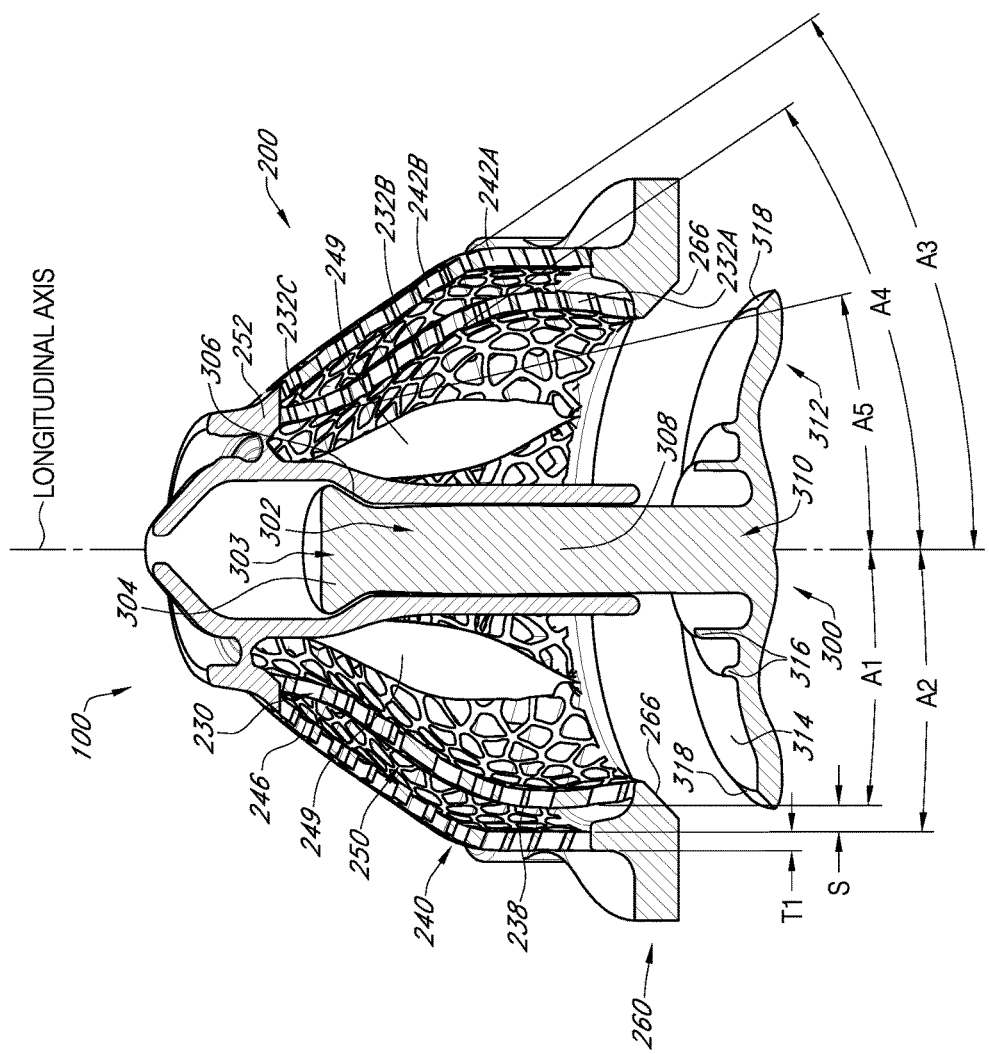
Figure 1F:
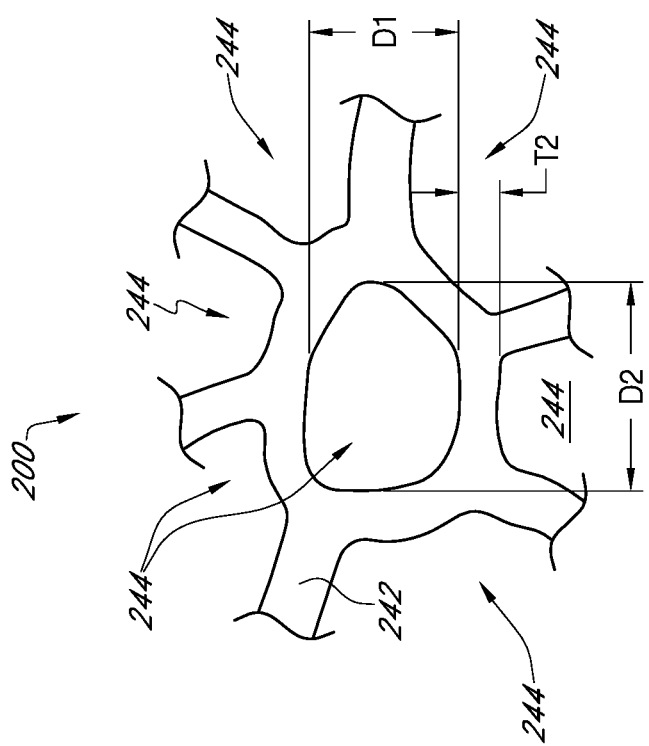
FIG. 1F is a detail view of a portion of an outer wall of the valve assembly of FIG. 1A.

FIG. 1C is a side view of the bleed valve assembly 100. As shown, the window 245A may have a height H. The height H may be from about 0.75 inches to about 12 inches, such as approximately 8 inches. In some embodiments, the height H may be about 1.375 inches. The apertures 244 may extend from or near the distal portion 104 and to or near to the proximal portion 102. In some embodiments, the apertures 244 may be located closer to the proximal portion 102, closer to the distal portion 104, located more to the left or right side of the axis as oriented, be grouped in more than one window 245A of apertures 244 on a given side of the housing 200 and/or formed in various concentrations. The line 1D-1D indicates a section cut of the valve assembly 100, for which the resulting section view is shown in FIGS. 1D-1E. A detail view of an embodiment of one of the apertures 244 is shown in FIG. 1F.

FIGS. 1D and 1E are cross-section views of the bleed valve assembly 100 as taken along the line 1D-1D indicated in FIG. 1C. As shown in FIG. 1D, the valve assembly 100 may include an outlet 108. The outlet 108 may be a volumetric region of the valve assembly 100 in which the air begins to exit the valve assembly 100. The outlet 108 may be defined at least in part by the first wall 230. Air may enter the valve assembly 100 at the inlet 106 and then flow to the outlet 108. The outlet 108 may include a volume that allows for expansion of the air therein. The valve assembly 100 may include an exit flow path 110. The path 110 may be a direction or directions along which air may exit the valve assembly 100. The path 110 may be an exit path from the outlet 108 to the exterior 112. The path 110 may be indirect, e.g. non-linear, as further described herein, for instance with respect to FIGS. 3A-3B. The outlet 108 and/or path 110 may be formed at least in part by the housing 200.

The valve assembly 100 may include a guide 202. The guide 202 may be an elongated structure and extend from a proximal portion 204 to a distal portion 206 along the longitudinal axis. The guide 202 may be located mostly or entirely inside of the valve assembly 100. The guide 200 includes a guide body 208. The body 208 extends circumferentially about and along the axis. The body 208 may be formed from a variety of materials, including stainless steel, other metals, polymers, composites or alloys, stainless steel 15-5PH powder, other powders, other suitable materials, or combinations thereof.

The guide 202 may include a variety of geometries. As shown, from the distal portion 206 to the proximal portion 204, the guide 202 may include a distal angled segment 210, a distal straight segment 212, an inwardly tapered segment 214, and a proximal straight segment 216. The various segments 210, 212, 214, 216 may form part of the body 208. The distal angled segment 210 and/or inwardly tapered segment 214 may extend at an angle with respect to the axis. The distal straight segment 212 and/or proximal straight segment 216 may extend generally parallel to the axis.

The guide 202 may provide a path for the valve 300 as the valve 300 moves. The proximal straight segment 216 may guide a stem 302 (see FIG. 1E) of the valve 300. The inwardly tapered segment 214 may include a tapered surface 215. The tapered surface 215 may contact or otherwise mechanically communicate with the valve 300. The inwardly tapered segment 214 may limit movement of the valve 300 in the proximal direction.

The guide 202 may define an internal chamber 218. The chamber 218 may be an opening extending at least partially through the guide 202. The chamber 218 may be defined by the body 208, for example by the segments 210, 212, 214 and/or 216. The guide 202 may include a distal opening 220 and/or a proximal opening 222. The chamber 218 may extend from or near the distal opening 220 and to the proximal opening 222. The chamber 218 may extend distally along the axis from the proximal opening 222 at the proximal portion 204. The valve 300, for example the stem 302 thereof, may extend through the proximal opening 222 and at least partially into the internal chamber 218.

The valve may include the first wall 230. The first wall 230 may be located inwardly relative to the second wall 240. The second wall 240 may thus surround the first wall 230. The first wall 230 may include a body 232 forming a plurality of apertures 234. For clarity, only some of the apertures 234 are labelled in the figures. The body 232 and apertures 234 of the first wall 230 may be analogous to, respectively, the body 242 and apertures 244 of the second wall 240. By "analogous" as used herein, it is meant they may include any or all of the same or similar features and/or functionalities as each other. Thus, the description above with respect to the body 232 may apply to the body 242, etc.

The first wall 230 may include an inner surface 236 and an outer surface 238. The inner surface 236 may be one or more surfaces of the body 232 facing inward. The outer surface 238 may be one or more surfaces of the body 232 facing outward. Thus the inner surface 236 may face the guide 202, the inlet 106, the valve 300, etc. The outer surface 238 may face the second wall 240. The thickness of the first wall 230 may be defined as the perpendicular distance between the inner and outer surfaces 236, 238. In some embodiments, the thickness of the first wall 230 is between about 50 mils and about 100 mils, such as approximately 70-80 mils.

The second wall 240 may include an inner surface 246 and an outer surface 248. The inner surface 246 may be one or more surfaces of the body 242 facing inward. The outer surface 248 may be one or more surfaces of the body 242 facing outward. Thus the inner surface 246 may face the first wall 230. The outer surface 248 may face the exterior 112. The thickness T1 of the second wall 240 (see FIG. 1E) may be defined as the perpendicular distance between the inner and outer surfaces 246, 248. In some embodiments, the thickness T1 of the second wall 240 is between about 50 mils and about 100 mils, such as approximately 70-80 mils. In some embodiments, the thickness of the first wall 230 can be substantially equal to the thickness T1 of the second wall 240. In other embodiments, the thickness of the first wall 230 can differ (e.g., be greater than, be smaller than) the thickness T1 of the second wall 240. As discussed previously, in some embodiments, the thickness of the first wall 230 and/or second wall 240 can be substantially constant across the wall. In other embodiments, the thickness of the first wall 230 and/or second wall 240 can vary (e.g., not be constant) across the wall.

In some embodiments, the valve assembly 100 may include fewer or more than two walls 230, 240. For example, the valve assembly 100 may include three, four, five or more walls, such as additional first and/or second walls 230, 240. As further example, the valve assembly 100 may include only one wall, such as only the first wall 230 or only the second wall 240. In some embodiments, the first and second wall 230, 240 maybe combined into a single wall, for instance where the flow channels are built into the wall and there is no channel 250 therebetween. In some embodiments, transverse elements may connect the first and second wall 230, 240 such that a single wall having voids, i.e. flow channels, therein results. Thus, the configuration shown and described is merely one example and others may be implemented. In other embodiments, the housing 200 can have two or more walls (e.g., first wall 230, second wall 240, etc.), where the walls are not concentric about the central axis of the housing 200.

As shown in FIG. 1E, the first and second walls 230, 240 may include various sections at various angles. The first wall 230 may include a proximal section 232A, an intermediate section 232B and a distal section 232C. In some embodiments, the first wall 230 may include one, two, four or more sections. Further, the sections may or may not be straight. Thus, any discussion of an "angle" of a section may refer to an angle of a line of best fit through that section.

The proximal section 232A may extend distally from the base 260. The proximal section 232A may extend axially, or at an angle A1 with respect to a portion of the axis that extends proximally to the valve assembly 100. In some embodiments, the angle A1 may be zero or non-zero. The intermediate section 232B may extend distally and toward the axis from the proximal section 232A at an angle A4 with respect a portion of the axis that extends proximally to the valve assembly 100. In some embodiments, the angle A4 may be zero or non-zero. The distal section 232C may extend distally and toward the axis from the intermediate section 232B at an angle A5 with respect to a portion of the axis that extends proximally to the valve assembly 100. In some embodiments, the angle A5 may be zero or non-zero. In some embodiments, the angle A5 may be greater than the angle A4. In some embodiments, the angle A4 may be ten, twenty, thirty, forty, fifty, or any lesser, intermediate or greater number of degrees with respect to a portion of the axis that extends proximally to the valve assembly 100. In some embodiments, the angle A5 may be ten, twenty, thirty, forty, fifty, or any lesser, intermediate or greater number of degrees with respect to a portion of the axis that extends proximally to the valve assembly 100. However, in other embodiments, the housing 200 (e.g., the first wall 230, second wall 240, etc.) can have a different shape or configuration. For example, in some embodiments, the walls 230, 240 can be cylindrical and substantially parallel to longitudinal axis at least along the proximal section 232A and/or intermediate section 232B. In another embodiment, the proximal section 232A can extend distally from the based 260 outward (e.g., away from the longitudinal axis). Optionally, the intermediate section 232B can extend distally and outward away from the longitudinal axis, or generally parallel to the longitudinal axis, or inward toward the longitudinal axis.

The second wall 240 may include a proximal section 242A and a distal section 242B. In some embodiments, the second wall 240 may include one, three or more sections. As with the first wall 230, the sections may or may not be straight, etc.

The proximal section 242A may extend distally from the base 260. The proximal section 242A may extend axially, or at an angle A2 with respect to a portion of the axis that extends proximally to the valve assembly 100. In some embodiments, the angle A2 may be zero or non-zero. The distal section 242B may extend distally and toward the axis from the proximal section 242A at an angle A3 with respect to a portion of the axis that extends proximally to the valve assembly 100. In some embodiments, the angle A3 may be zero or non-zero. In some embodiments, the angle A3 may be equal to or approximately equal to the angle A4.

The valve assembly 100 may include a channel 250. The channel may be formed by the housing 200. The channel 250 may be an annular space in between the first and second walls 230, 240. The second wall 240 may be radially spaced apart from the first wall 230 such that the channel 250 is defined therebetween. The channel 250 may therefore follow the contours of the first and second walls 230, 240. The channel 250 may be located between the lattice portions, e.g. the windows 245A, 245B, of the first and second walls 230, 240, and/or in between other portions of the first and second walls 230, 240.

In some embodiments, there may not be a channel 250. In some embodiments, there may be multiple channels 250, for example where there are more than two walls 230, 240. For instance, there may be three walls forming two channels 250, such as a first channel 250 in between the first and second walls 230, 240, and a second channel 250 in between the second wall 240 and a third wall that is outside of the second wall 240. In some embodiments, the one or more channels 250 may be interrupted, for example by the ribs 249. Thus, for example, there may be four channels 250 formed by the first and second walls 230, 240 and separated by the ribs 249 or other structures. In some embodiments, the channel 250 may be continuous along a circumferential path about the axis.

The channel 250 may have a spacing "S" as indicated in FIG. 1E. The spacing S may be a width of the channel 250. The spacing S may be measured perpendicularly from the outer surface 238 of the first wall to the inner surface 246 (or aperture 244 opening) of the second wall. The spacing S may be constant or may vary at different locations. The spacing S may vary along the axial and or circumferential lengths of the walls 230, 240. In some embodiments, the spacing S is between about 25 mils and about 0.75 inches, such as between about 50 mils and about 100 mils.

The valve assembly 100 may include an apex 252. The apex 252 may be part of the housing 200. The first and second walls 230, 240 may couple together at the apex 252. Thus the apex 252 may be a distal portion of the housing 200. The apex 252 may couple the walls 230, 240 with the guide 202, for example with the guide body 208 at the distal angled segment 210 or distal straight segment 212. In some embodiments, the walls 230, 240 may be coupled directly with the guide 202. For example, the walls 230, 240 may join together distally with the guide, or the channel 250 may extend to and be partially defined by a portion of the guide 200. Thus, the configuration shown is exemplary only.

The valve assembly 100 may include the base 260. The walls 230, 240 may couple with the base 260, for example with the flange 262. The walls 230, 240 may couple with an inner portion of the base 260 as shown. In some embodiments, the walls 230, 240 may couple with other portions of the base 260, including portions radially farther outward. In some embodiments, the walls 230, 240 may join together and then couple with the base 260, similar to the apex 252 at the distal portion 104. For instance, the walls 230, 240 may be coupled indirectly with the base 260 via an intermediate connection. Thus, the channel 250 may extend to the base 260, as shown. Or, in some embodiments, the channel 250 may not extend to the base 260.

The base 260 may include a seat 266. The seat 266 may be an inner, circumferential surface of the base 260. As shown, the seat 266 may be an inner tapered surface extending at an angle with respect to the axis at the proximal portion of the housing 200. The angle may be thirty degrees, forty-five degrees, sixty degrees, or any other lower, intermediate or greater angle, such as zero degrees (e.g., to provide a flat seat). The seat 266 may provide a complementary surface against which the valve 300 may seal when in the closed position. Thus the seat 266 may contact a portion of the valve 300 when closed. The seat 266 may be located along an inner edge of the base 260 as shown. In some embodiments, the seat 266 may extend farther inward and/or proximally relative to the base 260. Thus the configuration shown is merely exemplary.

The valve assembly 100 may include the valve 300. The valve 300 may be a separate component from the housing 200. In some embodiments, the valve 300 may be manufactured simultaneously with the housing 200, for example using ALM techniques, as further described herein.

The valve 300 may include a stem 302. The stem 302 may be an elongated portion of the valve 300. The stem 302 may have a rounded, e.g. circular, cross-section as take perpendicular to the axis. The stem 302 may have rounded cross-sections, non-rounded cross-sections, or combinations thereof. The stem 302 may extend from a distal end 303 to a proximal end 310. The stem 302 extends through the proximal opening 222 of the guide 202 and at least partially through the internal chamber 218 of the guide 202. The stem 302 may move within the guide 202. Pressures within the target system to which the valve assembly 100 is attached may cause movement of the valve 300 between an open and closed position, as further described.

The distal end 303 may move within a distal region of the internal chamber 218. The distal end 303 may have an outwardly tapered section 304 that limits proximal movement of the valve 300 by mechanically communicating with, for example contacting directly, the inwardly tapered segment 214 of the internal chamber 218. The outwardly tapered section 304 may include a tapered surface 306 that mechanically communicates with, for example contacts directly, the tapered surface 215 of the inwardly tapered segment 214 when the valve is moved sufficiently in the proximal direction. The outwardly tapered section 304 may not mechanically communicate with surfaces of the internal chamber 218 when moved sufficiently in the distal direction.

The stem 302 may include an intermediate section 308 coupled proximally with the distal end 303. The intermediate section 308 may be a continuation of the body of the stem 302 from the distal end 303. The intermediate section 308 may be straight or generally straight along the axis. The intermediate section 308 may have a smaller width than the widest portion of the distal end 303. The intermediate section 308 may extend through the proximal opening 222 of the guide 202. The intermediate section 308 may move partially into and partially out of the internal chamber 218.

The stem 302 may include a proximal end 310 coupled proximally with the intermediate section 308. The proximal end 310 may be a continuation of the body of the stem 302 from the intermediate section 308. The proximal end 310 may be straight or generally straight along the axis. The proximal end 310 may have a width similar or the same as the width of the intermediate section 308. The proximal end 310 may protrude out of the proximal opening 222 of the guide 202. The proximal end 310 may move partially into and partially out of the internal chamber 218.

The valve 300 may include a valve head 312. The head 312 may be located at a proximal end of the valve 300. The head 312 may include a body 314 that extends radially outward from the axis. The body 314 may have a disk or disk-like shape. The body 314 may be rounded, e.g. circular. In some embodiments, the body 314 may not be rounded. The body 314 may be coupled with and extend radially outward the proximal end 310 of the stem 300. The body 314 may have a width similar to the base 260, such as an inner width of the base 260.

The head 312 may include one or more spring guides 316. The spring guides 316 may be circumferential walls located radially inwardly. The spring guides 316 may extend distally from the body 314. There may be a taller, inner guide 316 surrounded by a shorter, outer guide 316, as shown. The spring guides 316 may facilitate assembly of the spring 320 (see FIGS. 2A-2B), for example by providing a channel into which a proximal end of the spring 320 is received, as further described. The spring guides 316 may also help align the valve 300 as it moves distally, for example by aligning the head 312 about the proximal portion 204 of the guide 202 when the valve 300 moves distally. That limits distal movement of the valve by mechanically communicating with the base The head 312 may include an outer taper 318. The outer taper 318 may be an angled, outer edge of the body 314. The outer taper 318 may complement the contour of the seat 266 of the housing 200. For example, the outer taper 318 may have an angle that matches that of the seat 266. The outer taper 318 may limit distal movement of the valve 300 by mechanically communicating with the base 260. The outer taper 318 may mechanically communicate with, for example directly contact, the seat 266 when the valve 300 moves sufficiently in the distal direction, such as when the valve 300 is in the closed position, as further described herein.

FIG. 1F is a detail view of the second wall 240 of the bleed valve assembly 100. A complete aperture 244 is shown, surrounded by partial views of surrounding apertures 244. The aperture 244 may be in any location of the windows 245A and/or 245B. Further, the description of the aperture 244 here may be analogous to the apertures of any other walls, such as the aperture 234 of the first wall 230, etc.

As shown, the aperture 244 may have a minor diameter D1 and a major diameter D2. The minor diameter D1 and major diameter D2 may refer to minimum and maximum widths of the aperture 244. In some embodiments, the minor diameter D1 may be from about 0.005 inches to about 0.250 inches. In some embodiments, the minor diameter D1 may be from about 0.010 inches to about 0.020 inches. In some embodiments, the minor diameter D1 may be between about 0.05 inches and about 0.2 inches, such as approximately 0.1 inches. In some embodiments, the minor diameter D1 may be 0.0125 inches or about 0.0125 inches. In some embodiments, the major diameter D2 may be from about 0.025 inches to about 0.5 inches. In some embodiments, the major diameter D2 may be between about 0.05 inches and about 0.2 inches, such as approximately 0.15 inches. In some embodiments, the major diameter D2 may be from about 0.050 inches to about 0.250 inches. In some embodiments, the minor diameter D1 may be 0.075 inches or about 0.075 inches. These are merely examples and the actual values for the minor diameter D1 and major diameter D2 may be smaller or greater.

The aperture 244 may have a variety of different shapes. The apertures 244 may all be the same shape, all different shapes, some the same, or some different. The aperture 244 may be a circle, in which case the minor and major diameters D1, D2 may be equal or approximately equal. In some embodiments, the aperture 244 may not be circular, such as elliptical, oval, etc. The aperture 244 may have edges that are rounded, straight, or combinations thereof. Further, the apertures 244 may have edges that are smooth, sharp, or combinations thereof. The apertures 244 may be a general polygonal shape, such as triangular, square, rectangular, rhomboid, pentagonal, hexagonal, etc.

The walls 230, 240 may have various thicknesses T1 to the bodies 232, 242, as discussed above, as well as various thicknesses T2 for the members of the bodies 232, 242 that form the apertures 234, 244. The second wall 240 may have a body 242 with members that have a thickness T2, as shown in FIG. 1F. The first wall 230 may have a body 232 that is analogous to the body 242. The body 242 may have members with a thickness T2 from about 0.010 inches to about 0.250 inches. In some embodiments, the body 242 may have a thickness T2 from about 0.020 inches to about 0.100 inches. In some embodiments, the body 242 may have a thickness T2 of 0.040 inches to 0.045 inches or from about 0.040 inches to about 0.045 inches. The thickness T2 may be uniform at various locations of the body 242. In some embodiments, the thickness T2 may vary at different locations of the body 242.

Figure 2A:
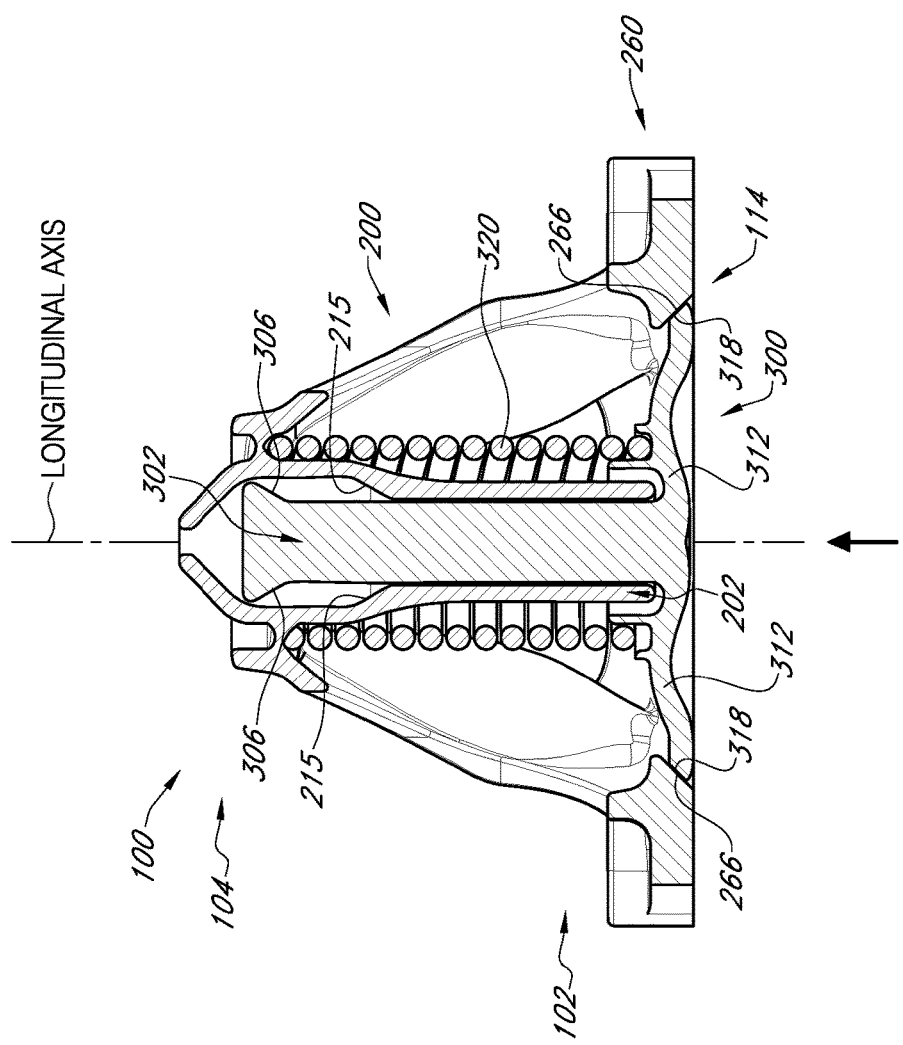

FIGS. 2A-2B are side cross-section views of the bleed valve assembly 100 shown, respectively, in a closed and open position. The valve assembly 100 includes a spring 320. The spring 320 is coupled with the housing 200 and the valve 300. The spring 320 may be coupled with the distal portion 104 of the valve 100 and with the proximal portion 102. The spring 320 may press against features of the distal portion 104, such as the guide 202, the apex 252, the proximal straight segment 216, and/or other features. The spring 320 may press against features of the proximal portion 104, such as the head 312, the proximal end 310 of the stem 302, and/or other features. The spring 320 may bias the valve 300 in the proximal direction. Further detail of the spring 320 such as its assembly with the valve 100 is described with respect to FIG. 8.

As shown in FIG. 2A, the housing 200 includes the valve 300 in the closed position. The valve 300 is moved distally relative to the open position. The tapered surface 306 of the stem 302 is not in mechanical communication with the tapered surface 215 of the guide 202. The head 312 has moved toward the housing 200. As shown, the head 312 seal against the housing 200. The outer taper 318 of the head 312 of the valve 300 may be sealed against the base 260 to form a sealed interface 114. The sealed interface 114 is formed by mechanical communication, for example direct contact, of the valve 300 and the housing 200. The sealed interface 114 substantially prevents fluids such as air from flowing into the housing 200 through the inlet 106. In some embodiments, the sealed interface 114 completely prevents fluids from flowing into the housing 200 through the inlet 106. In some embodiments, the sealed interface 114 partially prevents fluids from flowing into the housing 200 through the inlet 106. In some embodiments, in the closed position, the valve 300 and housing 200 do not form a sealed interface 114. For instance, the head 312 may be near but not contacting or not completely contacting the housing 260.

As shown in FIG. 2B, the housing 200 includes the valve 300 in the open position. The valve 300 is moved proximally relative to the closed position. The head 312 has moved away from the housing 200. As shown, the head 312 does not seal against the housing 200. The head 312 may be spaced apart from the base 260. The tapered surface 306 of the stem 302 may be in mechanical communication with the tapered surface 215 of the guide 202. In some embodiments, in the open position the tapered surface 306 of the stem 302 may not be in mechanical communication with the tapered surface 215 of the guide 202. As shown, the inlet 106 allows for air flow into the housing 200 in a generally distal direction.

The spring 320 may move and maintain the valve 300 in the open position. In some embodiments, the head 312 in the open position may seal against a pressurized opening of a target device, such as an aircraft engine. As the pressure within the target device increases and reaches a threshold, the pressure may push on the head 312 in the distal direction, thus moving the valve 300 distally. This may allow for pressurized fluid from the target device to bleed into the valve 100. Once the pressure within the target device reduces below a threshold, the spring 320 may then move the valve 300 back into the open position where the head 312 seals against the target device again. In some embodiments, the valve 100 is mechanically actuated. In other embodiments, the valve 100 is pneumatically actuated. In still other embodiments, the valve 100 is hydraulically operated. In yet other embodiments, the valve 100 can be operated via an electric motor.

Figure 2C:
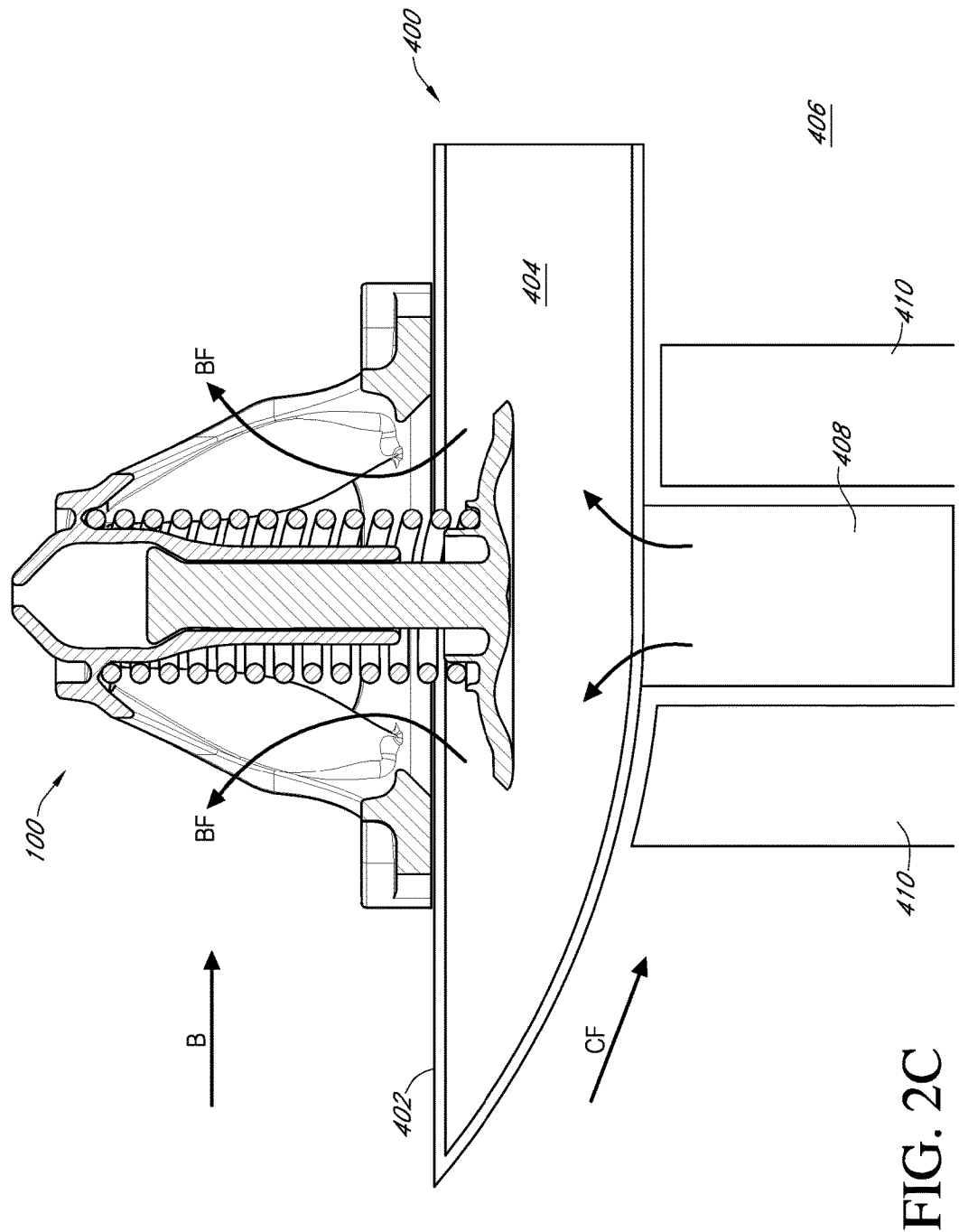
FIG. 2C is a schematic cross-sectional view of the valve assembly of FIGS. 2A-2B coupled to a surface of an aircraft engine.

FIG. 2C shows one embodiment of the valve 100 associated with an aircraft engine. The valve 100 can be mounted on an aircraft surface 402, such as a surface 402 of a compressor case 400, so that the one or more walls 230, 240 of the housing 200 are exposed to an airflow, such as a bypass flow B. In one embodiment, the compressor case 400 can have an annulus 404. The valve 100 can be mounted on an opposite side of the compressor case 400 from the core 406 of the compressor, which can have a stator 408 and a rotor 410. When the valve 100 is open, core compressor flow CF can flow through the stator 408 and into the annulus 404, via the annular opening between the valve seat 266 and the valve 300, and out through the apertures 234, 244 in the first and second walls 230, 240 of the housing 200 as bleed flow BF, which can then join the bypass flow B as shown by the arrows in FIG. 2C. The valve 100 can remain open as long as the pressure on the compressor side is below a certain level. In one embodiment, the valve 100 can be a normally closed. As previously discussed, the valve 100 can in one embodiment be mechanically operated (e.g., spring loaded). However, in other embodiments, the valve 100 can be operated in other suitable manners (e.g., pneumatically, hydraulically, via an electric motor). In practice, the valve 100 is normally closed due to the pressure in the compressor side being high enough to maintain the valve 300 in contact with the valve seat 266. If the turbine of the aircraft engine enters a stall state due to airflow, the valve 100 will open. Additionally, during a landing process of the aircraft, the power of the engine is decreased (e.g., the aircraft is essentially gliding), which decreases the pressure level in the compressor side, resulting in the opening of the valve 100, which can advantageously result in reduced noise levels during the landing process. In contrast, the valve 100 can be closed when the aircraft is in mid-flight.

Figure 2D:
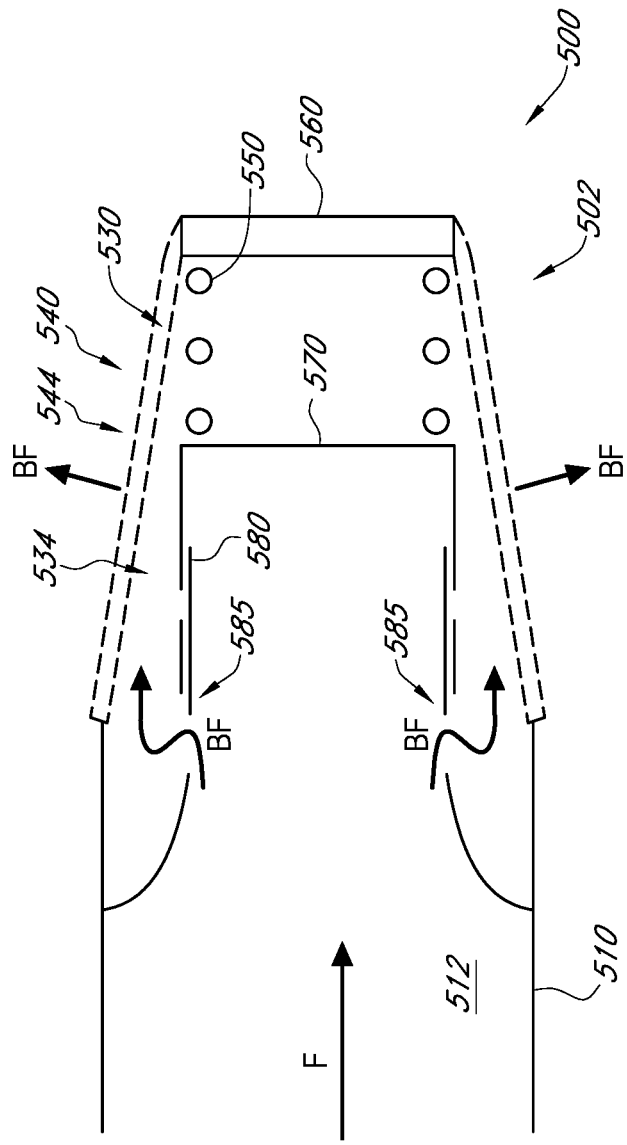
FIG. 2D is a schematic cross-sectional view of another embodiment of a valve assembly.

FIG. 2D shows a cross-section of another embodiment of a valve 500. The valve 500 can be a sleeve type valve, and have some of the same features as the valve 100 described above. In the illustrated embodiment, the valve 500 can be coupled to an end of a conduit 510 with a channel 512 through which a flow F (of air) passes. The valve 500 can have a housing 502 with a first wall 530, a second wall 540, and an end wall 560. The first and second walls 530, 540 can have a plurality of apertures 534, 544, which can be similar to the apertures 234, 244 described above. The valve 500 can also have an outer sleeve 570 that can slide relative to an inner sleeve 580. A spring 550 can be disposed between the end wall 560 and the outer sleeve 570. The inner sleeve 580 can have one or more apertures 585. When the valve 500 is in a closed position (e.g., when the pressure in the channel 512 is lower than the pressure exerted by the spring 550 on the outer sleeve 570), the outer sleeve 570 can be disposed over the inner sleeve 580 so as to close the apertures 585 and inhibit flow therethrough. When the valve 500 is in the open position (e.g., when the pressure in the channel 512 is greater than the pressure exerted by the spring 550 on the outer sleeve 570), the outer sleeve 570 can be moved toward the end wall 560 so as to uncover the apertures 585 and allow bleed flow BF to pass from the channel 512, through the apertures 585, and through the apertures 534, 544 of the first and second walls 530, 540. As with other embodiments, the housing 502 can have one or more walls (e.g., three walls, four walls, etc.).

Figure 2E:
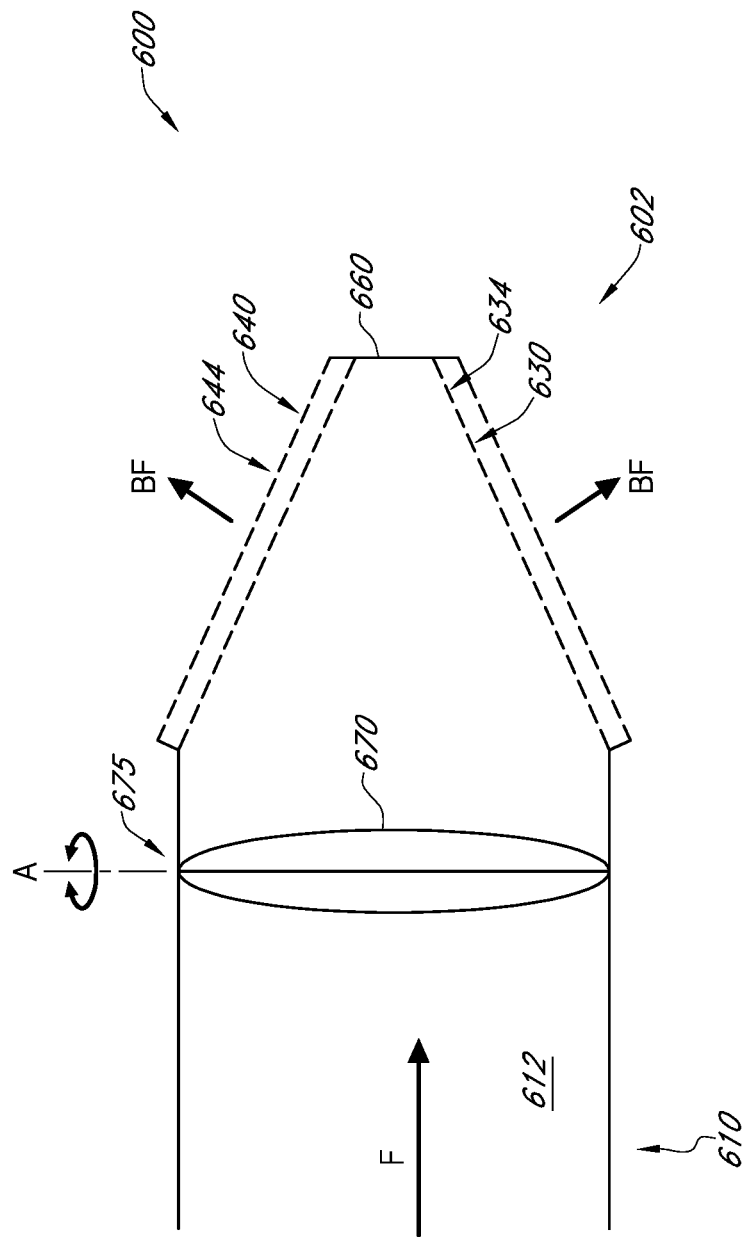
FIG. 2E is a schematic cross-sectional view of another embodiment of a valve assembly.

FIG. 2E shows a cross-section of another embodiment of a valve 600. The valve 600 can be a butterfly or ball type valve, and have some of the same features as the valve 100 described above. In the illustrated embodiment, the valve 600 can be coupled to an end of a conduit 610 with a channel 612 through which a flow F (of air) passes. The valve 600 can have a housing 602 with a first wall 630, a second wall 640, and an end wall 660. The first and second walls 630, 640 can have a plurality of apertures 634, 644, which can be similar to the apertures 234, 244 described above. The valve 600 can also have an ball or butterfly member 670 that extends across at least a portion of the channel 612 and can be coupled to an axle 675. The axle 675 can be actuated by an actuator A to open or close the valve 600. The actuator A can be a mechanical, hydraulic, pneumatic or electric actuator. When the valve 600 is in a closed position, the ball or butterfly member 670 can close the channel 612 to prevent flow F to pass therethrough. When the valve 600 is in the open position, the ball or butterfly member 670 can be oriented (e.g., actuated by the actuator) so as to allow bleed flow BF thereby, and through the apertures 634, 644 of the first and second walls 630, 640. As with other embodiments, the housing 602 can have one or more walls (e.g., three walls, four walls, etc.).

Figures 3A, 3B:
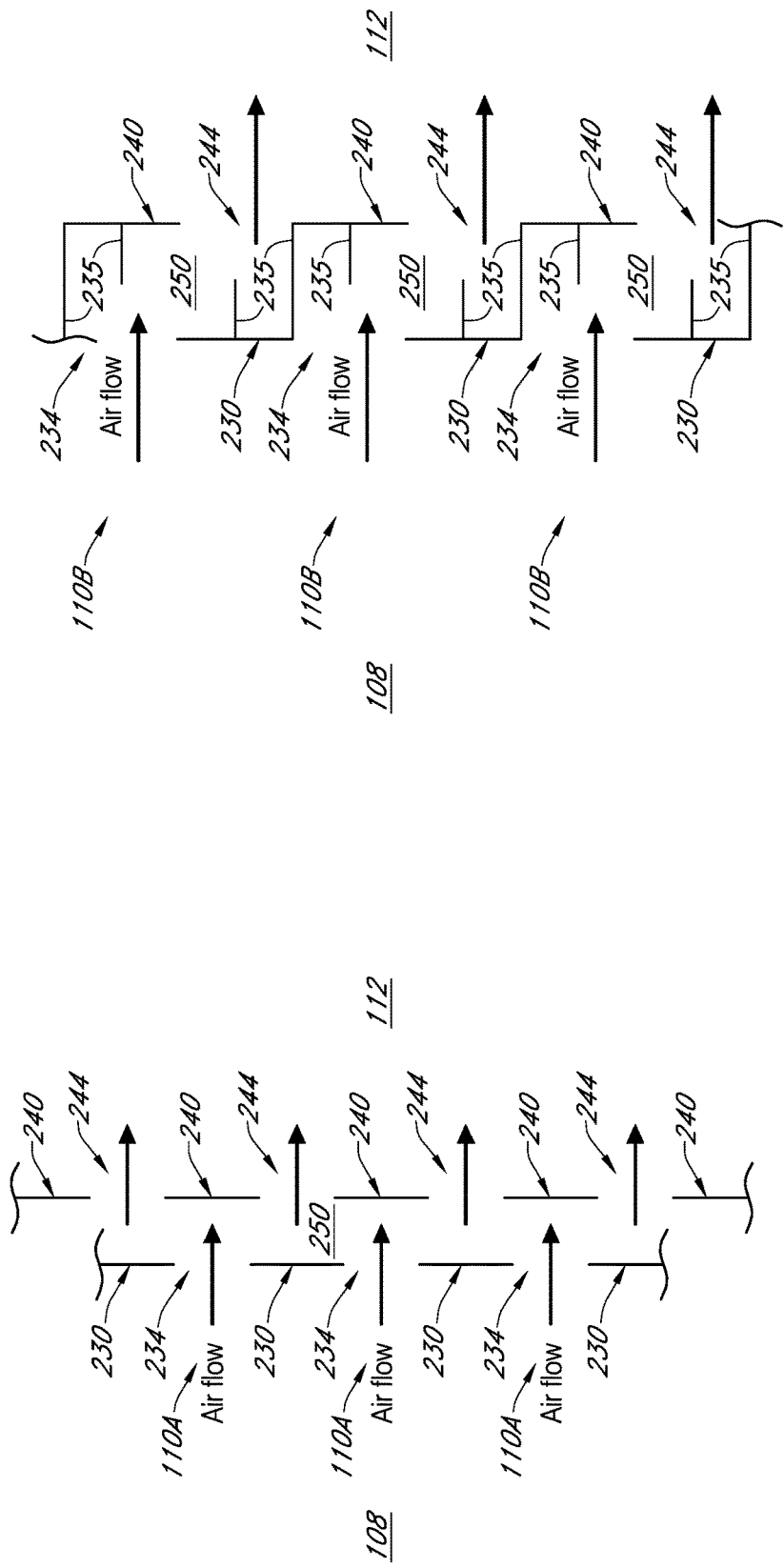
FIGS. 3A-3B are schematics showing embodiments of flow paths that may be incorporated with the bleed valve assembly of FIG. 1A.

FIGS. 3A-3B are schematics showing embodiments of flow paths 110A, 110B that may be incorporated with the bleed valve assembly 100. The flow paths 110A, 110B show examples of indirect flow paths for the fluid that exits the valve assembly 100. For instance, the flow paths 110A, 110B may be incorporated into the flow path 110 as shown in FIG. 1D.

As shown in FIG. 3A, the flow path 110A may extend through the aperture 234 of the first wall 230. The apertures 240 may be offset from the apertures 230, for example in the axial or generally axial direction, such that the flow path 110A from the outlet 108 to the exterior 112 is not direct, e.g. not linear. Thus, the fluid must change direction in order to flow through the apertures 230, 240. The apertures 230, 240 may thus be staggered to create the indirect flow paths. The apertures 230, 240 may be offset in the axial direction, circumferential direction, other directions, or combinations thereof. The channel 207 may be located between the first and second walls 230, 240 as shown.

FIG. 3B is another embodiment of an indirect flow path 110B through the first and second walls 230, 240. The apertures 240 may be offset from the apertures 230, as described above with respect to flow path 110A. As shown in FIG. 3B, the first and second walls 230, 240 may also include transverse elements 235. The transverse elements 235 in some embodiments may in part form the indirect flow paths 110B from the outlet 108 to the exterior 112. In some embodiments, the first and second walls 230, 240 may be connected in various locations, such as by the transverse elements 235, as further described herein. The channel 207 may be located between the first and second walls 230, 240 and may be around the various transverse elements 235. The configurations shown in FIGS. 3A and 3B are merely exemplary and other configurations may be implemented.

Figure 6:
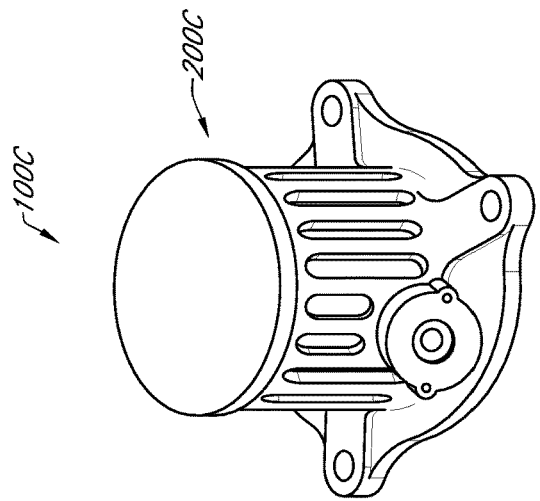
FIGS. 4-6 are perspective views of various embodiments of a bleed valve assembly.
Figure 5:
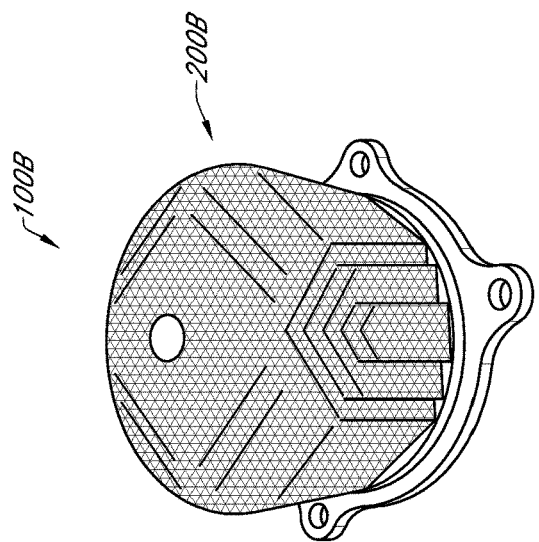
Figure 4:
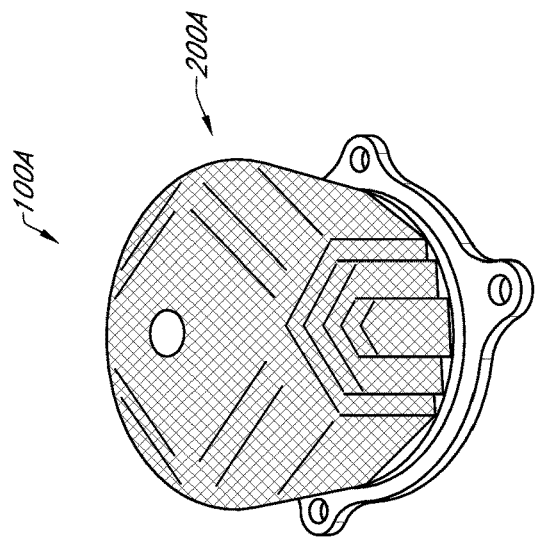

FIGS. 4-6 are perspective views of various embodiments, respectively, of valve assemblies 100A, 100B, 100C. The valve assemblies 100A, 100B, 100C may be analogous to the valve assembly 100 described herein. The valve assemblies 100A, 100B, 100C may be bleed valve assemblies, or other types of valve assemblies. Further, various shapes and configurations for the housing 200, valve 300, and other features may be incorporated. For instance, the valve assembly 100A, 100B may be more "muffin" shaped, or the valve assembly 100C may be more cylindrical, etc. Thus, the particular features and shapes, configurations, etc. for the valve assembly 100 described in detail herein are merely exemplary, and these valve assemblies 100A, 100B, 100C and other embodiments may incorporate the features for noise suppression.

Figure 7:
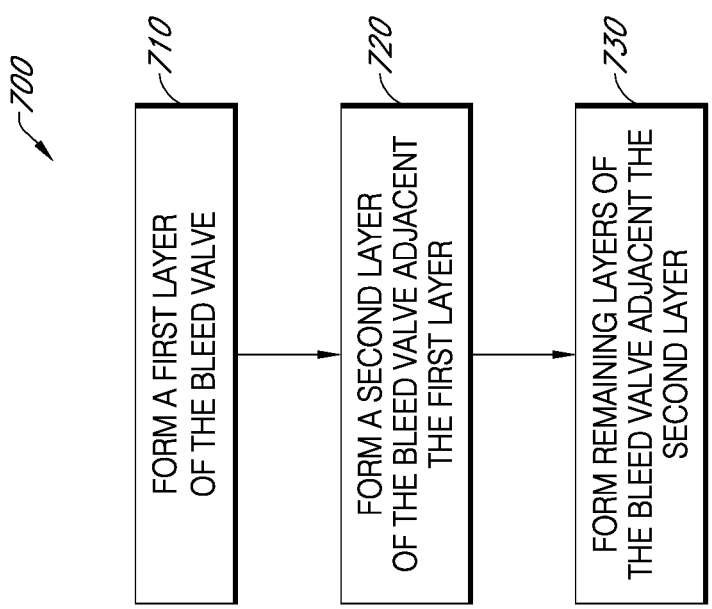
FIG. 7 is a flow chart showing an embodiment of a method of manufacturing the bleed valve assembly of FIG. 1A by additive layer manufacturing (ALM).

FIG. 7 is a flow chart showing an embodiment of a method 700 of manufacturing the bleed valve assembly 100 by additive layer manufacturing (ALM), also known as additive manufacturing (AM), or "3D printing." ALM may include processes used to synthesize a three-dimensional object in which successive layers of material are formed under computer control to create the object. Objects can be of almost any shape or geometry and may be produced using digital model data from a 3D model or another electronic data source such as an Additive Manufacturing File (AMF) file. The method 700 may be performed by a variety of different ALM machines, also known as 3D printers. A variety of different types of ALM may be used. ALM may use a process that deposits a binder material onto a powder bed with inkjet printer heads layer by layer. In some embodiments, the ALM process may include binder jetting, directed energy deposition, material extrusion, material jetting, powder bed fusion, sheet lamination, vat photopolymerization, other techniques, or combinations thereof.

The method 700 may begin with step 710 wherein a first layer of the valve assembly 100 is formed using ALM. The first layer may refer to an end layer of the valve assembly 100, such as a layer at the proximal end 102 or the distal end 104. In some embodiments, the layer may be a side layer of the valve assembly 100, for example a layer parallel to the axis and on one or the other lateral sides of the assembly 100. "Lateral" as used herein refers to transverse directions, such as perpendicular to the axis. In some embodiments, the first layer may be an intermediate layer that is not at any end of the assembly 100, such as a middle layer.

The method 700 then moves to step 720 wherein a second layer of the valve assembly 100 is formed adjacent the first layer. The second layer may be on top of the first layer. The second layer may be an adjacent layer in the proximal or distal direction of the assembly 100. The second layer may be an adjacent lateral layer.

The method 700 then moves to step 730 wherein the remaining layers of the valve assembly 100 are formed. In some embodiments, the remaining layers may be formed adjacent to the second layer. In some embodiments, the remaining layers are formed in the distal or proximal direction. In some embodiments, the remaining layers are formed in the lateral direction.

The method 700 may be used to form the housing 200. The use of the ALM techniques allows for the intricate details of the lattice sections of the first and second walls 230, 240, and other features. ALM allows for fabrication of a monolithic part, as described herein. Such monolithic part is continuous and made from the same piece of resulting material. Although different materials may be used in forming the housing 200 using ALM techniques, such a resulting housing 200 would still be a monolithic piece. The valve 300 may likewise be fabricated in this manner. In some embodiments, the complete valve assembly 100 may be fabricated in this manner. For example, the housing 200 with the valve 300 assembled therein may be collectively fabricated using the various ALM techniques. This may simplify the assembly of the valve assembly 100, for example by having the valve 300 already assembled in the housing 200 after fabrication, thus reducing the time and cost of manufacture and assembly as compared, for example, to a two-piece valve 300 that must be assembled with the housing 200 and then put together. This also saves time and cost associated with assembling the housing 200, such as the first and second walls 230, 240 and the other features thereof. Thus, the use of ALM techniques allows for production of a fully integrated valve assembly 100, i.e. having noise suppression features integrated therein and thus not requiring a separate muffler, silencer, etc.

Figure 8:
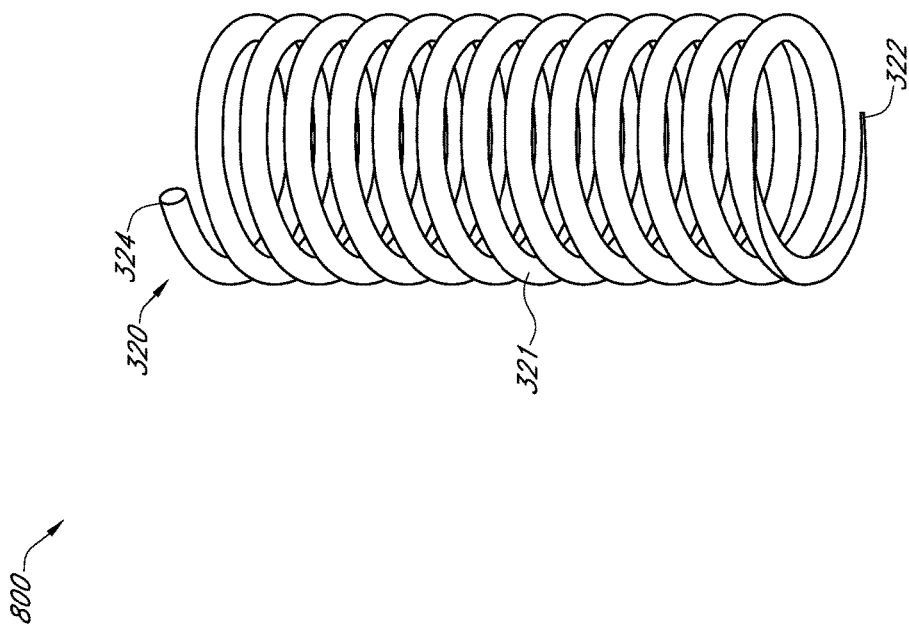
FIG. 8 depicts various steps showing an embodiment of a method for assembling the bleed valve assembly of FIG. 1A.
Figure 8:
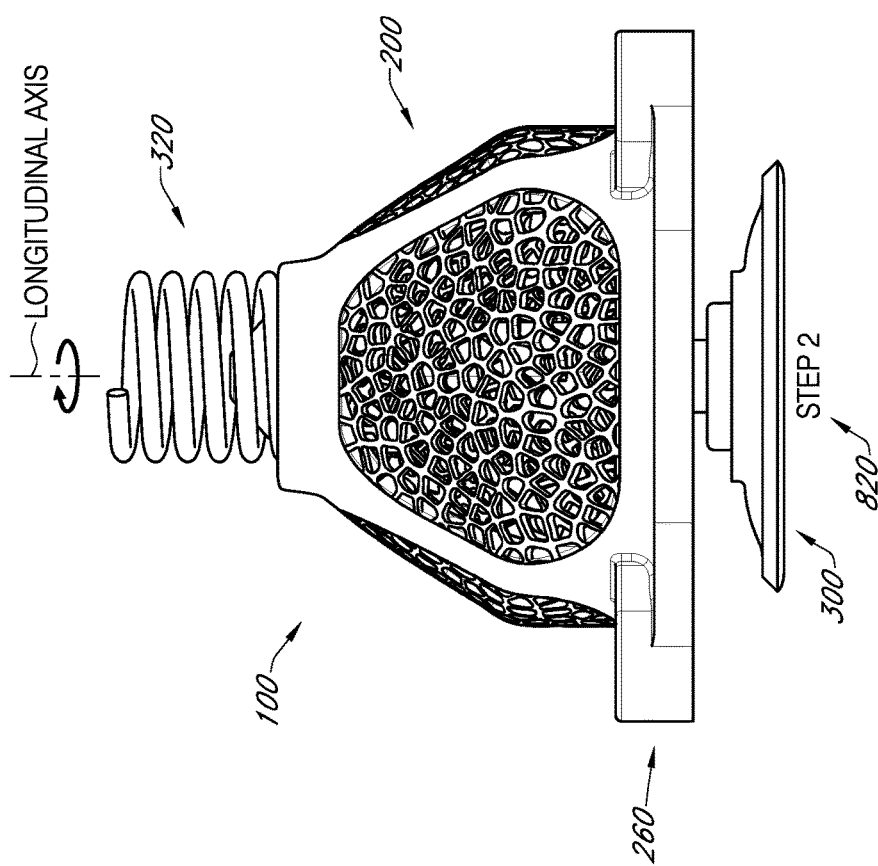
Figure 8:
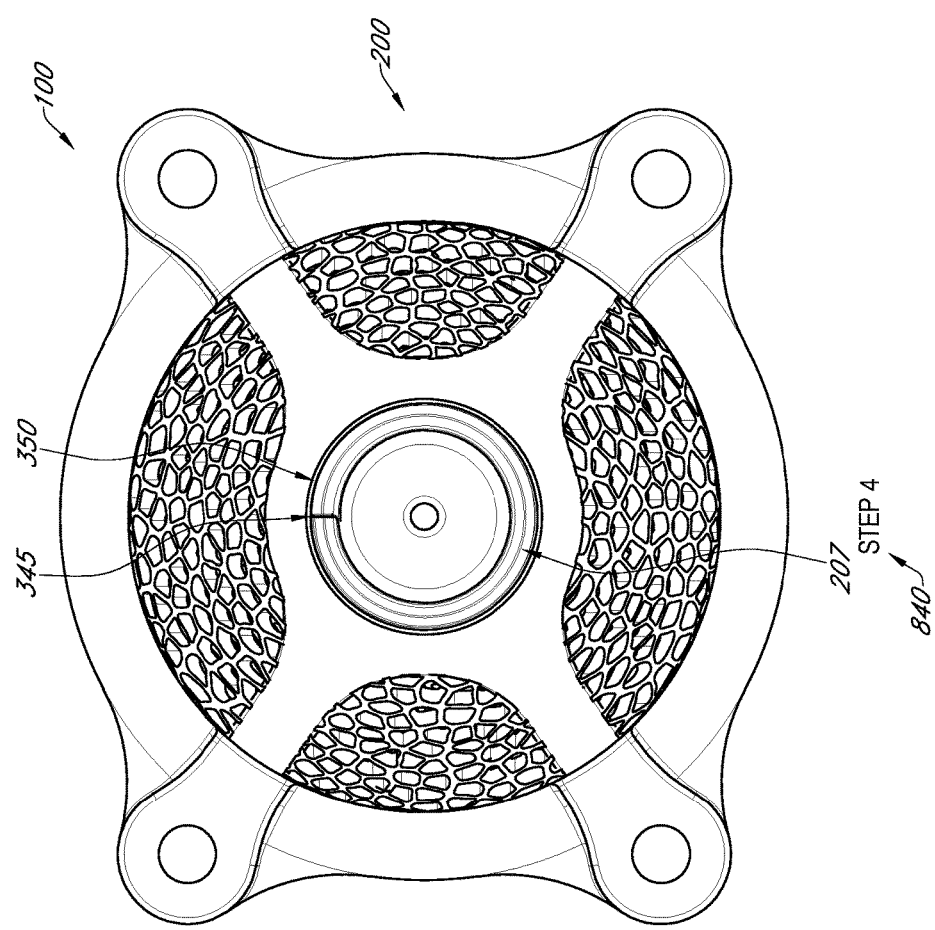

FIG. 8 depicts various steps showing an embodiment of a method 800 for assembling the bleed valve assembly 100. The spring 320 may be used. The spring 320 may have a body 321 extending in a coil from a proximal end 322 to a distal end 324. The proximal and/or distal ends 322, 324 may be ground, for example sharpened, to facilitate assembly.

The method 800 may begin with step 810 wherein the housing 200 and valve 300 are provided. The proximal end 322 of the spring 320 may then be inserted into the spring channel 207. The spring channel 207 may be a groove at the distal portion 104 or the proximal portion 102 of the valve assembly 100. The spring channel 207 may include a spring entry hole 345 (see step 840) into which the spring 320 is initially inserted.

The method 800 then moves to step 820 wherein the spring 320 is rotated into the housing 200. The spring 320 may be rotated about the axis as shown. The spring 320 may be rotated by hand, or using an appropriate tool.

The method 800 then moves to step 830 wherein the spring 320 is rotated such that the distal end 324 is in or near the spring channel 207. A spring insertion tool 340 may be used to farther rotate the spring 320 into the housing 200. The spring insertion tool 340 may include an axial member to align it with the housing 200 and side tabs for grabbing with a hand or tool. The spring insertion tool 340 may include a contact member to contact the distal end 324 of the spring in or near the spring channel 207. The spring insertion tool 340 may be rotated about the axis by pushing on the side tabs to provide a moment arm to rotate the spring 320 farther into the housing 200.

The method 800 then moves to step 840 wherein a stop feature 350 near the spring entry hole 345 prevents counter rotation of the spring 320. The stop feature 350 may be located inside the spring channel 207.

It is understood that any specific order or hierarchy of steps or blocks in any disclosed process is an example of a sample approach. Based upon design preferences, it is understood that the specific order or hierarchy of steps or blocks in the processes can be rearranged while remaining within the scope of the present disclosure. Any accompanying method claims present elements of the various steps or blocks in a sample order, and are not meant to be limited to the specific order or hierarchy presented.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "may," "could," "might," "can," and the like, unless specifically stated otherwise, or otherwise understood within the context as used, is generally intended to convey that certain embodiments include, while other embodiments do not include, certain features, elements, and/or steps. Thus, such conditional language is not generally intended to imply that such features, elements, and/or steps are in any way required for one or more embodiments.

Language of degree used herein, such as the terms "approximately," "about," "generally," "substantially," and the like, as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

It will be understood by those within the art that, in general, terms used herein are generally intended as "open"

terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A valve assembly comprising:
    a housing comprising:
        a base at a proximal end of the housing, the base extending circumferentially about a longitudinal axis;
        a first wall coupled with the base and extending to a distal end of the housing so that the first wall attaches with a surface of a solid body at the distal end of the housing, the first wall extending circumferentially about the longitudinal axis, the first wall comprising a plurality of first apertures extending therethrough; and
        a second wall coupled with the base and extending to the distal end of the housing so that the second wall attaches with the surface of the solid body, the second wall extending circumferentially about the longitudinal axis and at least partially surrounding the first wall, the second wall comprising a plurality of second apertures extending therethrough, wherein the housing defines a continuous structure and the first and second walls join together at the solid body of the housing;
    an elongated guide extending from a proximal portion located between the base of the housing and the distal end of the housing to a distal portion coupled to the distal end of the housing, the elongated guide extending along the longitudinal axis and having an internal chamber extending along the axis to a proximal opening at the proximal portion; and
    a valve comprising:
        an elongated stem extending from a distal end to a proximal end, the stem extending through the proximal opening of the guide and at least partially through the internal chamber of the guide, the distal end having an outwardly tapered section that limits proximal movement of the valve by mechanically communicating with an inwardly tapered section of the internal chamber of the guide; and
        a valve head coupled with and extending radially outward from the proximal end of the stem that limits distal movement of the valve by mechanically communicating with the base, wherein the valve is moveable proximally and distally along the longitudinal axis between an open position and a closed position, wherein in the open position the valve head is spaced apart from the base and in the closed position the valve head abuts the base; and
        a spring surrounding the guide and extending from the distal portion of the guide to a proximal portion of the valve, wherein the spring biases the valve to the open position.

2. The valve assembly of claim 1, wherein the plurality of first apertures of the first wall are offset from the plurality of second apertures of the second wall so as to define a plurality of non-linear flow paths that extend from the plurality of first apertures to the plurality of second apertures.

3. The valve assembly of claim 1, wherein at least some of the first and second apertures are non-circular.

4. The valve assembly of claim 1, wherein the plurality of first and second apertures define first and second lattices of the first and second walls, respectively.

5. The valve assembly of claim 1, wherein the second wall is radially spaced apart from the first wall such that a channel is defined therebetween, wherein an annular width of the channel varies between the first and second walls at different locations along lengths of the first and second walls.

6. The valve assembly of claim 1, wherein the housing is formed by additive layer manufacturing (ALM).

7. The valve assembly of claim 1, wherein the elongated guide, the base, the first wall, the second wall, and the valve are formed by additive layer manufacturing (ALM).

8. The valve assembly of claim 1, wherein the housing is monolithic.

9. The valve assembly of claim 8, wherein the monolithic housing is dome-shaped.

* * * * *